(12) United States Patent
Chen et al.

(10) Patent No.: US 9,305,353 B1
(45) Date of Patent: Apr. 5, 2016

(54) LANDMARK BASED POSITIONING

(71) Applicant: QUALCOMM Incorporated, San Diego, CA (US)

(72) Inventors: Jiajian Chen, San Jose, CA (US); Hui Chao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/494,484

(22) Filed: Sep. 23, 2014

(51) Int. Cl.
| G01C 21/00 | (2006.01) |
| G06T 7/00 | (2006.01) |
| G06T 19/20 | (2011.01) |
| G06T 15/00 | (2011.01) |
| G06T 11/20 | (2006.01) |
| G06T 11/40 | (2006.01) |
| G06T 11/00 | (2006.01) |

(52) U.S. Cl.
CPC ............ *G06T 7/0032* (2013.01); *G06T 7/0046* (2013.01); *G06T 7/0081* (2013.01); *G06T 11/001* (2013.01); *G06T 11/203* (2013.01); *G06T 11/40* (2013.01); *G06T 15/005* (2013.01); *G06T 19/20* (2013.01); *G06T 2200/04* (2013.01); *G06T 2207/10004* (2013.01); *G06T 2207/10032* (2013.01); *G06T 2207/30204* (2013.01); *G06T 2219/2004* (2013.01); *G06T 2219/2012* (2013.01)

(58) Field of Classification Search
USPC ......................................................... 701/454
See application file for complete search history.

(56) References Cited

U.S. PATENT DOCUMENTS

| 2004/0090444 | A1* | 5/2004 | Satoh ............................ 345/633 |
| 2010/0176987 | A1* | 7/2010 | Hoshizaki ............... 342/357.02 |
| 2010/0287485 | A1 | 11/2010 | Bertolami et al. |
| 2011/0082668 | A1* | 4/2011 | Escrig et al. ...................... 703/1 |
| 2011/0320123 | A1* | 12/2011 | Choi et al. .................... 701/300 |
| 2012/0042036 | A1* | 2/2012 | Lau et al. ...................... 709/217 |
| 2012/0083285 | A1 | 4/2012 | Shatsky et al. |
| 2012/0105271 | A1* | 5/2012 | Watanabe et al. ............. 342/147 |
| 2012/0213443 | A1* | 8/2012 | Shin et al. ..................... 382/190 |
| 2013/0101163 | A1 | 4/2013 | Gupta et al. |
| 2013/0102334 | A1 | 4/2013 | Khorashadi et al. |
| 2013/0143603 | A1 | 6/2013 | Diacetis et al. |
| 2013/0236105 | A1 | 9/2013 | Chao et al. |
| 2013/0236106 | A1 | 9/2013 | Chao et al. |
| 2013/0238234 | A1 | 9/2013 | Chao et al. |
| 2013/0322767 | A1 | 12/2013 | Chao et al. |
| 2014/0274138 | A1 | 9/2014 | Chao et al. |
| 2015/0172626 | A1* | 6/2015 | Martini ............................ 703/1 |

* cited by examiner

*Primary Examiner* — Hussein A. Elchanti
(74) *Attorney, Agent, or Firm* — Berkeley Law & Technology Group LLP

(57) ABSTRACT

Disclosed are devices, methods and storage media for use in determining position information for imaging devices or mobile devices. In some implementations, a landmark is identified in an image which is obtained from an imaging device which in turn is positioned at a location and in a pose. A virtual two-dimensional image that would be visible from the landmark is determined based, at least in part, on the pose. The location or position information is based, at least in part, on the virtual two-dimensional image.

17 Claims, 13 Drawing Sheets

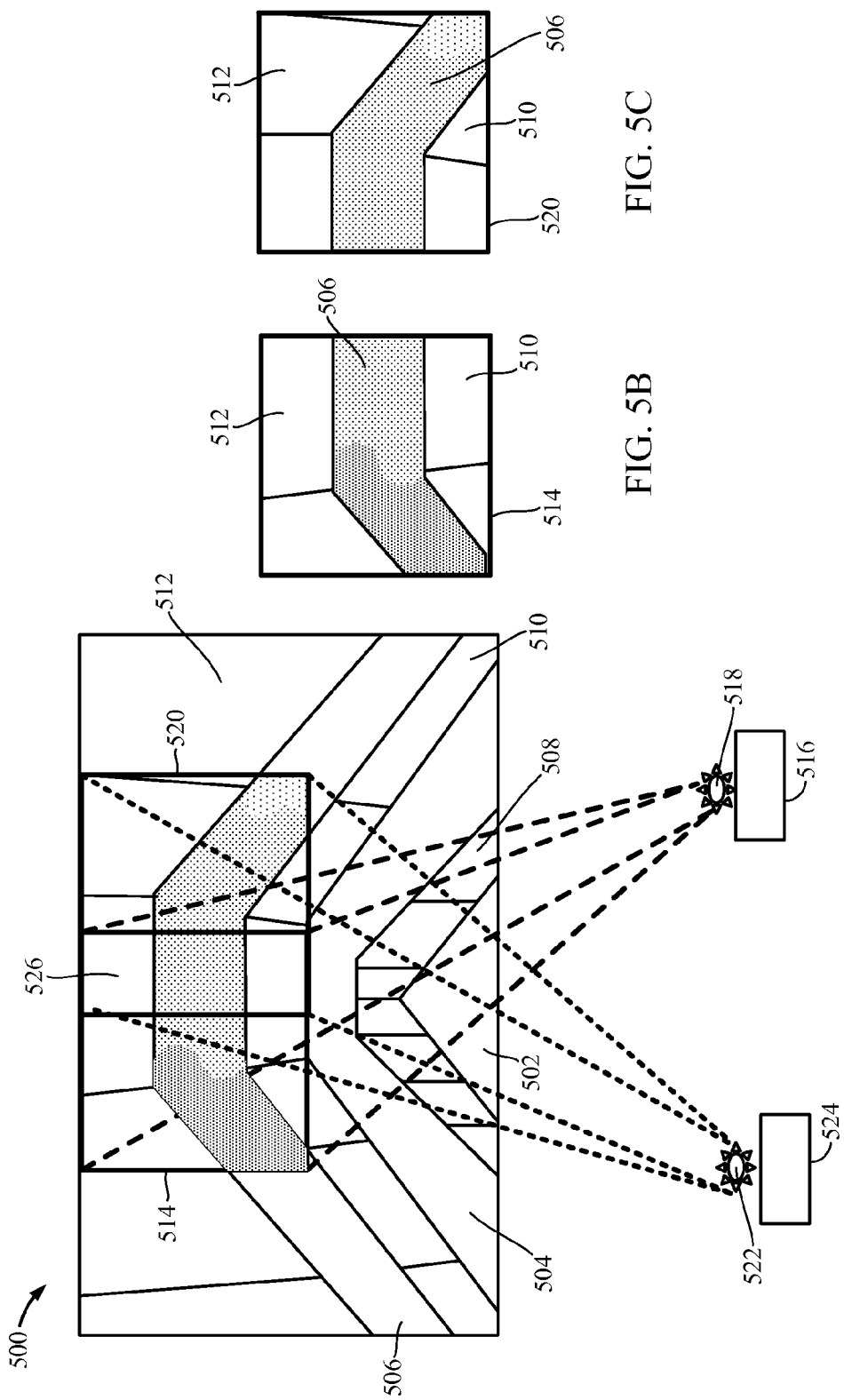

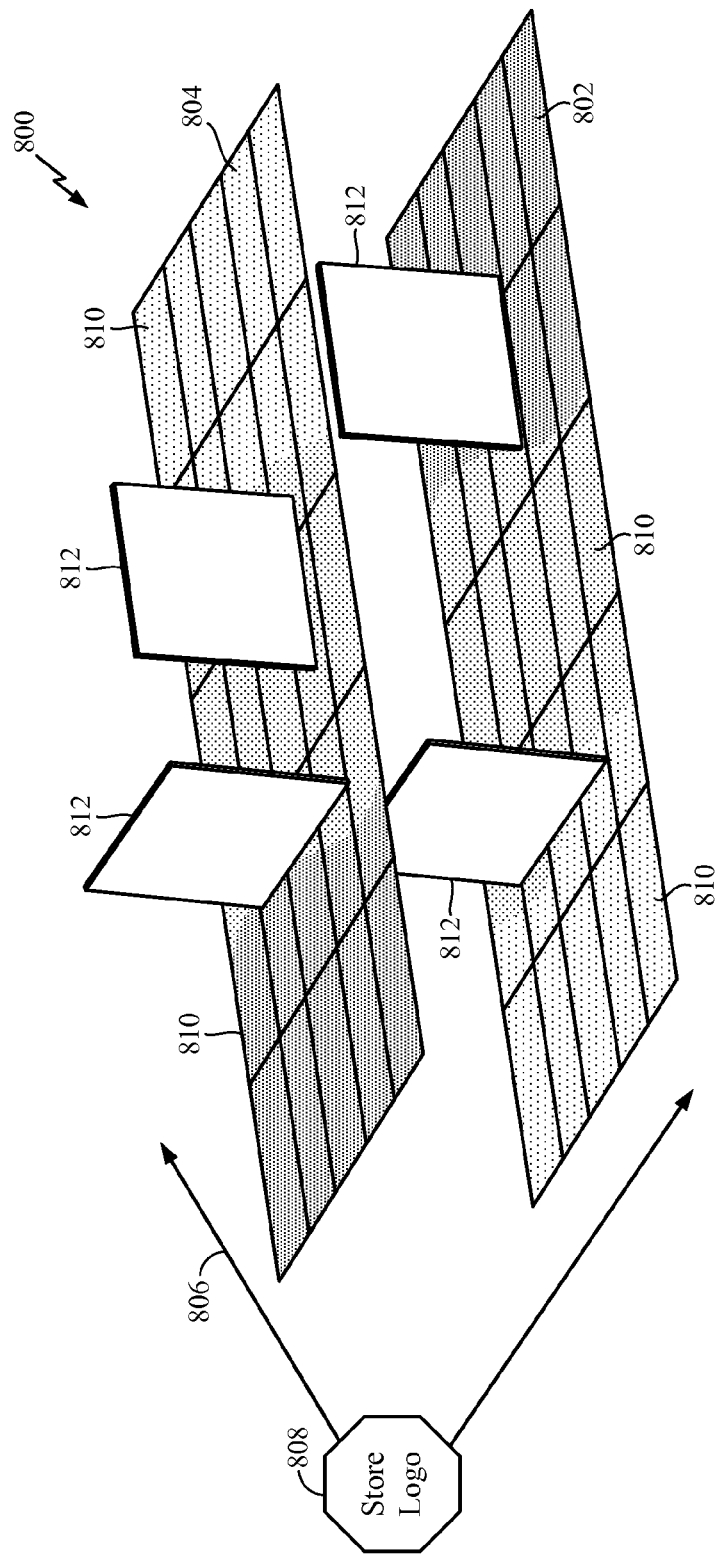

LANDMARK BASED POSITIONING

FIELD

Embodiments described herein are generally directed to landmark based positioning techniques, including in some embodiments techniques for estimating the position of mobile devices.

INFORMATION

Global Positioning Systems (GPS) and other satellite positioning systems (SPS) have enabled navigation services for mobile handsets in outdoor environments. Since satellite signals may not be reliably received or acquired in an indoor environment, different techniques can be employed to enable navigation services. For example, mobile devices can typically obtain a position fix by measuring ranges to three or more terrestrial wireless access points which may be positioned at known locations. These ranges can be measured, for example, by obtaining a MAC ID address from signals received from the access points and measuring one or more characteristics of signals received from the access points such as, for example, received signal strength indicator (RSSI), round trip delay (RTT), just to name a few examples.

SUMMARY

Broadly speaking, certain embodiments of the claimed subject matter relate to the conversion of a two-dimensional map of a region or venue into a three-dimensional map or model. In a first embodiment, using the three-dimensional map, certain areas may be color coded. They are the areas on which an imaging device (including a mobile imaging device being held by a user) potentially could be located, such as for example floors, escalators, etc. The lens of the imaging device may be pointed in the direction of a landmark having a known location (such as a store front or a store sign for example) while the corresponding pose of the imaging device (e.g., its elevation and/or azimuth) is recorded. Using the pose information a selected view or portion of the three-dimensional venue map may be rendered into a virtual, two-dimension image according to an implementation. This selected view may correspond to a line of sight, visible area where the imaging device could be located and as would be viewed theoretically from the perspective of the landmark in the direction of the imaging device. According to an implementation, the color coding may be used to derive or estimate an area on a map where the imaging device (and by inference its user) may be located.

In a second embodiment a method for determining a location comprises identifying a first landmark in a first image obtained from an imaging device positioned at a first location. The imaging device is in a first pose during the time that the first image is obtained. Using a processor, a first virtual two-dimensional image of a first view from a first viewpoint at the first landmark is determined based, at least in part, on the first pose. The first location is estimated based, at least in part, on the determined first virtual two-dimensional image.

In an aspect of the second embodiment a second landmark in a second image is identified. The second image was obtained from the imaging device positioned at the first location. The imaging device is in a second pose during the time that the second image is obtained. The second pose is different from the first pose. A second virtual two-dimensional image of a second view from a second viewpoint at the second landmark is determined based, at least in part, on the second pose. The estimating of the first location includes estimating the first location based, at least in part, on a matching of portions of the determined first virtual two-dimensional image with portions of the second virtual two-dimensional image.

In a third embodiment an apparatus comprises a memory and one or more processors in communication with the memory. The one or more processors are configured to identify a first landmark in a first image. The first image was obtained by the apparatus positioned at a first location. The apparatus is in a first pose during the time that the first image is obtained. The one or more processors are further configured to determine a first virtual two-dimensional image of a first view from a first viewpoint at the first landmark based, at least in part, on the first pose. The one or more processors are further configured to estimate the first location based, at least in part, on the first virtual two-dimensional image.

In an aspect of the third embodiment, the one or more processors are further configured to identify a second landmark in a second image. The second image was obtained by the apparatus positioned at the first location. The apparatus is in a second pose during the time that the second image is obtained. The second pose is different from the first pose. The one or more processors are further configured to determine a second virtual two-dimensional image of a second view from a second viewpoint at the second landmark based, at least in part, on the second pose. The estimating of the first location includes estimating the first location based, at least in part, on a matching of portions of the first virtual two-dimensional image with portions of the second virtual two-dimensional image.

In a fourth embodiment a non-transitory, computer-readable, storage medium comprises machine-readable instructions stored thereon which are executable by a special purpose computing apparatus to identify a first landmark in a first image. The first image was obtained by the special purpose computing apparatus positioned at a first location. The special purpose computing apparatus is in a first pose during the time that the first image is obtained. The instructions are further executable by the special purposed computing apparatus to determine a first virtual two-dimensional image of a first view from a first viewpoint at the first landmark based, at least in part, on the first pose. The instructions are further executable by the special purposed computing apparatus to estimate the first location based, at least in part, on the first virtual two-dimensional image.

In an aspect of the fourth embodiment the instructions are further executable by the special purpose computing apparatus to identify a second landmark in a second image. The second image was obtained by the special purpose computing apparatus positioned at the first location. The special purpose computing apparatus is in a second pose during the time that the second image is obtained. The second pose is different from the first pose. The instructions are further executable by the special purpose computing apparatus to determine a second virtual two-dimensional image of a second view from a second viewpoint at the second landmark based, at least in part, on the second pose. The estimating of the first location includes estimating the first location based, at least in part, on a matching of portions of the first virtual two-dimensional image with portions of the second virtual two-dimensional image.

There are additional aspects to claimed subject matter. It should therefore be understood that the preceding is merely a brief summary of some embodiments and aspects of the claimed subject matter. Additional embodiments and aspects are referenced below. It should further be understood that numerous changes to the disclosed embodiments can be made without departing from the spirit or scope of the claimed subject matter. The preceding summary therefore is not meant to limit the scope of the claimed subject matter. Rather, the scope of the claimed subject matter is to be determined by appended claims and their equivalents.

BRIEF DESCRIPTION OF THE DRAWINGS

These and/or other aspects and advantages of the claimed subject matter will become apparent and more readily appreciated from the following description of certain implementations, taken in conjunction with the accompanying drawings of which:

FIGS. 5A, 5B and 5C are a simplified view of a three-dimensional model or map of a shopping mall venue which includes two landmarks according to an implementation;

FIG. 8 is a simplified illustration of certain detail of the color coding and image processing of a three-dimensional model according to an embodiment;

DETAILED DESCRIPTION

Figure 1:
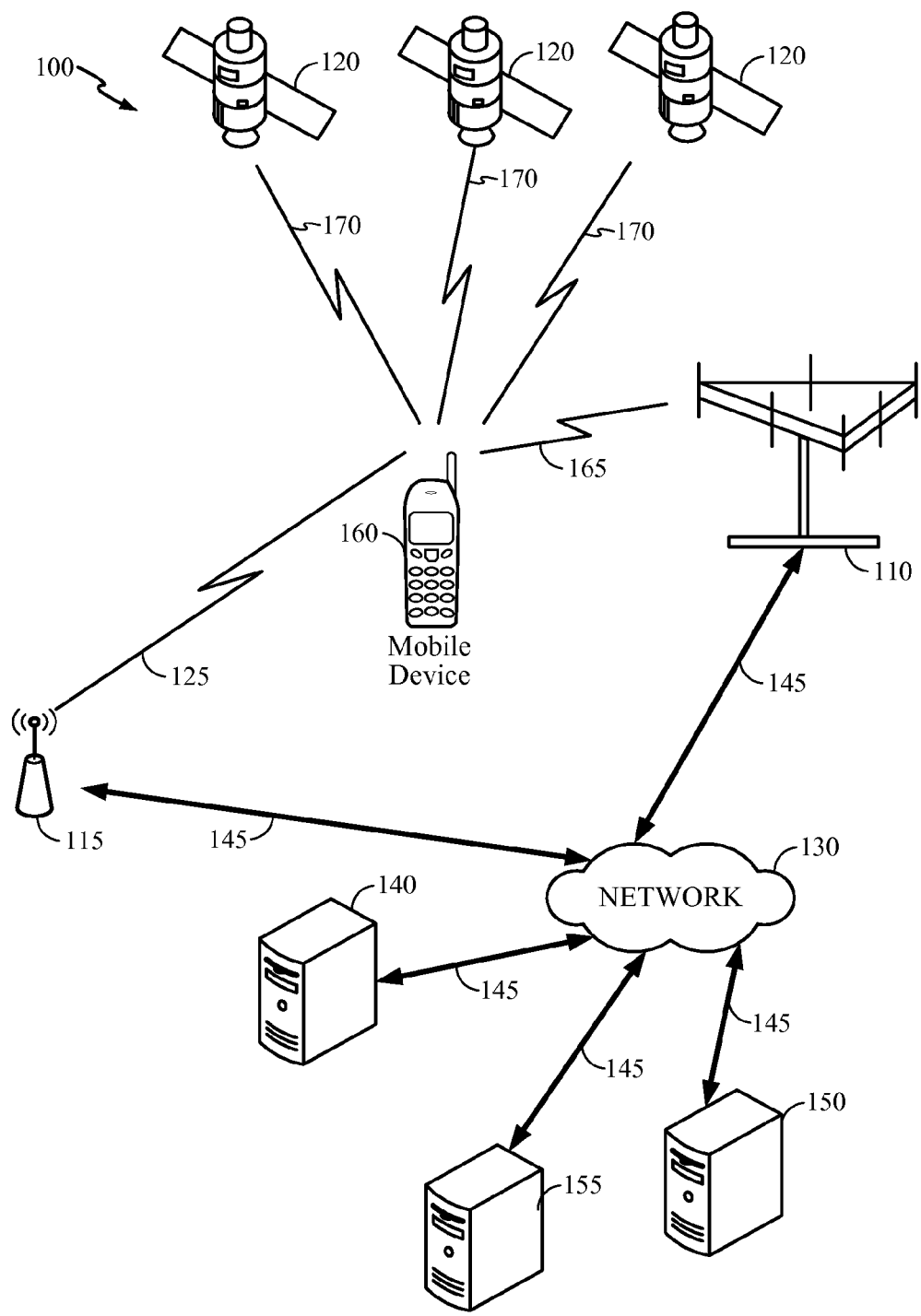
FIG. 1 is simplified view of a mobile device in communication with various components of a communication system according to certain implementations.

The following description is of the best mode presently contemplated for carrying out claimed subject matter. Moreover in the following description, details are set forth by way of example to enable a person of ordinary skill in the art to practice the claimed subject matter without undue experimentation. Reference will be made in detail to embodiments of the present claimed subject matter, examples of which are illustrated in the accompanying drawings, wherein like reference numerals refer to like elements throughout. It is understood that other embodiments may be used and structural and operational changes may be made without departing from the scope of the present claimed subject matter.

GPS and other satellite positioning systems have enabled navigation services for mobile devices in outdoor environments. Since satellite signals may not be reliably received or acquired in an indoor environment, different techniques may be employed to enable navigation services. Other mobile positioning techniques include recognition of objects in features in an image obtained at an imaging device (e.g., in a camera phone). For example, locations of visual landmarks may be known a priori. Recognition of a visible landmark in an image obtained at an imaging device can suggest that the device is in visual proximity of, or located in some relation to, the landmark. In landmark based positioning, one method for estimating a user's location is based on a visible region of a landmark. For example in a shopping mall venue, for a given storefront that is observed by a camera, the camera's location may be inversely estimated based on the floor area from which this storefront is visible or in a line of sight. An intersection of areas observable from multiple landmark locations can improve the accuracy of a position estimation.

Some methods of estimating a location of an imaging device may be straightforward and enable a quick computation of a location estimate in a particular case of a two-dimensional map (e.g., the camera and landmarks are located on the same vertical elevation, level or floor). However, this technique can become more complicated and require significantly more computational resources in a multi-level environment where visible landmarks of interest are located on a floor or vertical level different from each other or from that of the imaging device. Techniques such as ray tracing can be used to project rays from identified landmarks. Intersections of rays projected from identified landmarks may at least in part define an area or region where the imaging device may be located. Unfortunately, ray tracing in three dimensions can be computationally complex.

However in a particular alternative implementation, certain computational complexities may be reduced for the generation of position estimates, especially in environments having landmarks located on different levels or elevations. According to an implementation, a three-dimensional map is used which includes certain areas that are uniquely coded such as, for example, color coded, i.e., coded according to a color scheme. Alternative coding schemes may include a numerical coding of the selected areas of the map. In one implementation, the coded areas of the three-dimensional map are limited to those on which an imaging device potentially could be located such as, for example, floors, escalators, etc., as opposed to walls or ceilings, for example. However in other implementations, the coded areas of the map may include all areas of the map.

The lens of the imaging device may be pointed in the direction of one of the landmarks having a known location (such as a store front or a store sign, for example) while the corresponding pose parameters of the imaging device are recorded. An image that includes the landmark is captured by the imaging device. A selected view or portion of the three-dimensional map (including at least some of its coded areas) is rendered into two dimensions using the pose parameters. This selected view corresponds to a line of sight, visible area (as would be "viewed" from the perspective of the landmark) where the imaging device could be located. According to an implementation, the coded areas are used to derive or estimate a location or area where the imaging device may be located.

In certain implementations, as shown in FIG. 1, a system 100 may include a mobile device 160 that can receive or acquire satellite positioning system (SPS) signals 170 from SPS satellites 120. In some embodiments, the SPS satellites 120 may be from one global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. In other embodiments, the SPS satellites may be from any one several regional navigation satellite systems (RNSS') such as, for example, Wide Area Augmentation System (WAAS), European Geostationary Navigation Overlay Service (EGNOS), Quasi-Zenith Satellite System (QZSS), just to name a few examples.

Mobile device 160 may transmit radio signals to, and receive radio signals from, a wireless communication network. In one example, mobile device 160 may communicate with a cellular communication network by transmitting wireless signals to, or receiving wireless signals from, a base station transceiver 110 over a first wireless communication link 123. Similarly, mobile device 160 may transmit wireless signals to, or receive wireless signals from a local transceiver 115 over a second wireless communication link 125.

In a particular implementation, local transceiver 115 may be configured to communicate with mobile device 160 at a shorter range over second wireless communication link 125 than at a range enabled by the base station transceiver 110 over first wireless communication link 123. For example, local transceiver 115 may be positioned in an indoor environment. Local transceiver 115 may provide access to a wireless local area network (WLAN, e.g., IEEE Std. 802.11 network) or wireless personal area network (WPAN, e.g., Bluetooth network). In another example implementation, local transceiver 115 may comprise a femto cell transceiver capable of facilitating communication on the second wireless link 125 according to a cellular communication protocol. Of course it should be understood that these are merely examples of networks that may communicate with a mobile device over a wireless link, and claimed subject matter is not limited in this respect.

In a particular implementation, base station transceiver 110 and local transceiver 115 can communicate with any one or more of a plurality of servers (comprising a first server 140, a second server 150, and a third server 155) over a network 130 through links 145. Here, network 130 may comprise any combination of wired or wireless links. In a particular implementation, network 130 may comprise Internet Protocol (IP) infrastructure capable of facilitating communication between mobile device 160 and servers 140, 150 or 155 through local transceiver 115 or the base station transceiver 110. In another implementation, network 130 may comprise cellular communication network infrastructure such as, for example, a base station controller or master switching center (not shown) to facilitate mobile cellular communication with mobile device 160.

In particular implementations, and as discussed elsewhere herein, mobile device 160 may have circuitry and processing resources capable of computing a position fix or estimated location of mobile device 160. For example, mobile device 160 may compute a position fix based, at least in part, on pseudorange measurements to four or more SPS satellites 120. Here, mobile device 160 may compute such pseudorange measurements based, at least in part, on pseudonoise code phase detections in signals 170 acquired from four or more SPS satellites 120. In particular implementations, mobile device 160 may receive from one or more of servers 140, 150, 155 positioning assistance data to aid in the acquisition of signals 170 transmitted by the SPS satellites 120 including, for example, almanac, ephemeris data, Doppler search windows, just to name a few examples.

In other implementations, mobile device 160 may obtain a position fix by processing signals received from terrestrial transmitters fixed at known locations (e.g., such as base station transceiver 110) using any one of several techniques such as, for example, advanced forward trilateration (AFLT) and/or observed time difference of arrival (OTDOA). In these particular techniques, a range from mobile device 160 may be measured to three or more of such terrestrial transmitters fixed at known locations based, at least in part, on pilot signals transmitted by the transmitters fixed at known locations and received at mobile device 160. Here, the one or more of servers 140, 150, 155 may be capable of providing positioning assistance data to mobile device 160 including, for example, locations and identities of terrestrial transmitters to facilitate positioning techniques such as AFLT and OTDOA. For example, servers 140, 150 or 155 may include a base station almanac (BSA) which indicates locations and identities of cellular base stations in a particular region or regions.

In particular environments such as, for example, indoor environments, outdoor stadiums, or urban canyons, mobile device 160 may not be capable of acquiring signals 170 from a sufficient number of SPS satellites 120 or perform AFLT or OTDOA to compute a position fix. Alternatively, mobile device 160 may be capable of computing a position fix based, at least in part, on signals acquired from local transmitters (e.g., WLAN access points, femto cell transceivers, Bluetooth devices, etc., positioned at known locations). For example, mobile devices may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or round trip time (RTT).

In alternative implementations, mobile device 160 may obtain an indoor position fix by applying characteristics of acquired signals to a radio heatmap indicating expected RSSI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected RSSI or RTT. It should be understood, however, that these are merely examples of values that may be stored in a radio heatmap, and that claimed subject matter is not limited in this respect.

In a particular implementation, mobile device 160 may also apply signals received from a magnetometer to signatures in a magnetic heatmap indicating expected magnetic signatures at particular locations in an indoor area. In particular implementations, for example, a "magnetic heatmap" may associate expected magnetic signatures or compass deviations with locations in an indoor area allowing a mobile device to estimate its location based, at least in part, on an association of magnetic heatmap values with compass or magnetometer measurements obtained at the mobile device.

In particular implementations, mobile device 160 may receive positioning assistance data for indoor positioning operations from one or more of the servers 140, 150, 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, magnetic heatmaps, locations and identities of transmitters, routeability graphs, just to name a few examples. Other assistance data received by mobile device 160 may include, for example, local maps of indoor areas for display or to aid in navigation. Such a map may be provided to mobile device 160 as it enters a particular indoor area. The map may show indoor features such as doors, hallways, entry ways, walls, etc., points of interest such as bathrooms, pay phones, room names, stores, etc. By obtaining and displaying such a map, mobile device 160 can overlay its current location (and therefore that of its user) over the displayed map to provide the user with additional context.

In one implementation, a routeability graph and/or digital map assist mobile device 160 in defining feasible areas for navigation within an indoor area and subject to physical obstructions (e.g., walls) and passage ways (e.g., doorways in walls). Here, by defining feasible areas for navigation, mobile device 160 can apply constraints to aid in the application of filtering measurements for estimating locations and/or motion trajectories according to a motion model (e.g., according to a particle filter and/or Kalman filter). In addition to measurements obtained from the acquisition of signals from local transmitters, according to a particular embodiment, mobile device 160 can further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating a location or motion state of mobile device 160.

According to an embodiment, mobile device 160 accesses indoor navigation assistance data through one or more servers 140, 150, 155 by, for example, requesting the indoor assistance data through selection of a universal resource locator (URL). In one implementation, the indoor navigation assistance data may be on server 140, and the position assistance data referred to above may reside on a different server such as, for example, server 150. In another implementation, however, the indoor navigation assistance data as well as the position assistance data may reside on a single server, such as server 155, for example. Alternatively the indoor navigation assistance data may reside on mobile device 160 initially so that this data need not be retrieved from one or more servers 140, 150, 155.

In particular implementations, one or more servers 140, 150, 155 may be capable of providing navigation assistance data to cover many different indoor and/or outdoor areas including, for example, floors of buildings, wings of hospitals, terminals at an airport, portions of a university campus, portions of a stadium, areas of a large shopping mall, just to name a few examples. Also, memory resources at mobile device 160 and data transmission resources may make receipt of indoor navigation assistance data for all areas served by servers 140, 150, 155 impractical or infeasible. A request for indoor navigation assistance data from mobile device 160 may indicate a rough or course estimate of a location of mobile device 160. Mobile device 160 can then be provided with indoor navigation assistance data covering areas including and/or proximate to the rough or course estimate of the location of mobile device 160.

In one particular implementation, a request for indoor navigation assistance data from mobile device 160 specifies a location context identifier (LCI). Such an LCI may be associated with a locally defined area such as, for example, a particular floor of a building or other indoor area, which is not mapped according to a global coordinate system. In one example, upon entry of an area mobile device 160 may request a server, such as first server 140 for example, to provide one or more LCIs covering the area or adjacent areas. Here, the request from mobile device 160 may include a rough location of mobile device 160 such that the requested server can associate the rough location with areas covered by known LCIs, and then transmit those LCIs to mobile device 160. Mobile device 160 can then use the received LCIs in subsequent messages with a different server, such as second server 150 for example, for obtaining navigation assistance data relevant to an area identifiable by one or more of the LCIs as discussed above (e.g., digital maps, locations and identities of beacon transmitters, radio heatmaps or routeability graphs).

In another implementation, first server 140 may be configured to render or generate a three-dimensional model or map of an indoor or outdoor environment based on a two-dimensional map of the environment having one or more landmarks at known locations. In an alternative implementation, mobile device 160 may be configured to render the three-dimensional model based on the two-dimensional map. First server 140 and/or mobile device 160 may be configured to access the two-dimensional map of the environment from a navigation database or receive the two-dimensional map from a navigation server. In yet another implementation, the three-dimensional model or map already exists, and accordingly it need not be rendered from a two-dimensional map.

A two-dimensional map of the environment may be analyzed to derive or render the three-dimensional model. Basic structural components of the indoor environment can be identified, such as walls, doors, windows, floors and ceilings. Some basic assumptions can be made about the structure of the environment if the two-dimensional map of the environment does not provide information to the contrary. For example, assumptions can be made that the floors and ceilings are parallel to the ground unless otherwise specified. As another example, the system may be configured to recognize that the environment includes a ramp or escalator at a particular location and could render that portion of the floor to be sloped rather than perpendicular to a ground plane. As another assumption, the walls and doors can be assumed to be placed perpendicular to the floor unless otherwise specified by the two-dimensional map. According to an implementation, first server 140 or mobile device 160 may be further configured to selectively render certain portions of the three-dimensional model so that these portions are tessellated into graphic primitives, each one of which is uniquely marked or coded. The portions of the model that are selectively rendered may include floors, ramps and escalators, for example, but not walls or ceilings. In an implementation, graphic primitives may be uniquely coded with a color scheme or code.

In one implementation, a two-dimensional map of a region or venue may be converted to a three-dimensional model or map using one or more assumptions such as, for example, that the walls are disposed perpendicularly to the floors. Using a three-dimensional map, certain areas may be tessellated into graphic primitives and are uniquely coded. They are the areas on which a mobile imaging device potentially could be located, such as for example the floors, escalators, etc. Other areas, such as walls or ceilings, for example, are not uniquely coded. The lens of the imaging device are pointed in the direction of one of the landmarks at the venue (such as a store front or a store sign for example) and an image is taken while the corresponding pose or view of the device (e.g., its elevation and/or azimuth and its viewing angle toward the landmark) is estimated and recorded. This information represented as the range of rotation and distance to the landmark may be estimated based on the appearance of the landmark and/or the surrounding structure in the image, more specifically by comparing the visual feature key points in the current image to ones in the reference image or by finding the vanishing points of the lines in the image that present the edges of the walls, floors and the doors, etc.

Using the pose parameters, a selected view or portion of the three-dimensional venue map may be rendered into two dimensions. This selected view may be from a viewpoint at the landmark looking in the opposite direction, when the opposite view of the pose parameter is used, e.g., a view that corresponds to a line of sight, visible area where the imaging device could be located as would be viewed from the perspective of the landmark and "looking" in the direction of the imaging device. The color coding and graphic primitives are used to derive or estimate the location or region on the map where the imaging device (and by inference its user, in some embodiments) may be located.

In another implementation, a location of the imaging device can be estimated with improved accuracy by using a second landmark having a known location. While remaining at the same position where the device was pointed at the first landmark, the imaging device can be pointed in the direction of the second landmark while the corresponding second pose of the device is recorded. Using the second pose parameters a selected, second view of the three-dimensional venue map is rendered into two dimensions. This second view may be from a viewpoint at the second landmark, e.g., a view that corresponds to a line of sight, visible area where the imaging device (and by inference its user) could be located as would be viewed from the perspective of the second landmark and "looking" in the direction of the user's imaging device. The color coding and graphic primitives are used to correspond to, derive or estimate a second location or region on the map where the imaging device could be located. Now having identified a first region based upon the first landmark and first pose parameters and a second region based upon the second landmark and second pose parameters, the two regions can be compared. The area where they match or overlap (according to the coding of the respective graphic primitives) may correspond to a refined estimation of the location where the imaging device (and by inference its user) may be located.

Figure 2:
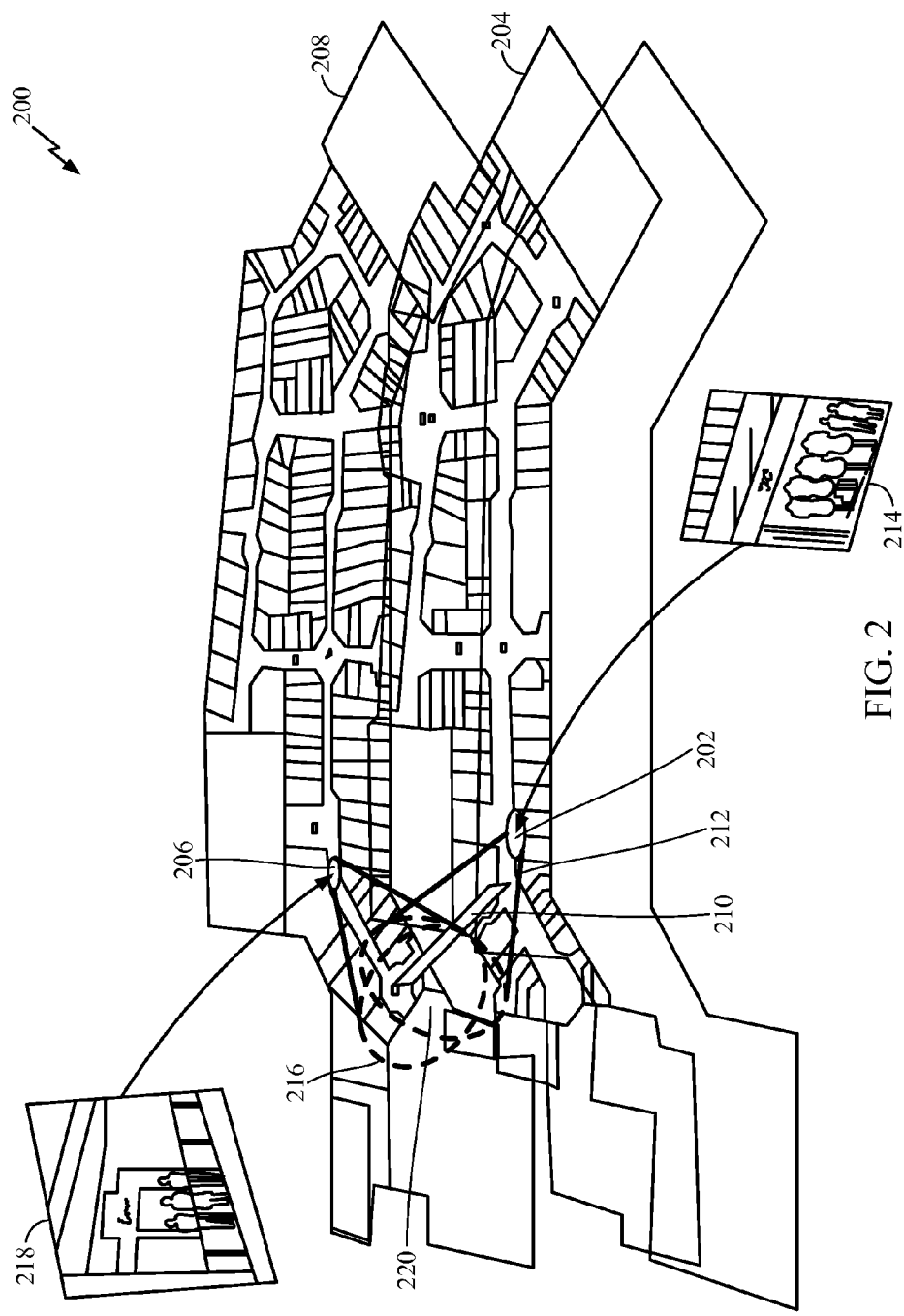
FIG. 2 is a simplified view of a three-dimensional model or map of a shopping mall venue according to an implementation.

FIG. 2 is a simplified depiction of a three-dimensional model or map 200 of a shopping mall venue having three floors or levels according to one implementation. In an implementation, the three-dimensional model was generated from a two-dimensional map of the mall provided by a local server as location assistance data. Included in the three-dimensional map 200 is a first landmark 202 in the form of a first storefront located on a second floor 204 and a second landmark 206 in the form of a second storefront located on a third floor 208, i.e., located on a different elevation or level than the first storefront. Also shown is an escalator 210 connecting the second and third floors 204, 208. A first cone of visibility 212 extends from the first landmark 202 and encompasses a portion of the escalator 210 and a portion of the third floor 208. Thus if an imaging device lens is pointed in the direction of the first landmark 202 while the device is located on any area within the first cone of visibility 212, the first landmark 202 would appear in a first perspective view which is similar to that shown in FIG. 2 at reference numeral 214. Camera or imaging device pose parameters (generated and recorded while pointing the imaging device in the direction of the first landmark 202) is used to derive the first cone of visibility 212 in this three-dimensional model as would be "viewed" from the first landmark 202. However according to an implementation, it is not necessary for a physical camera to have been used and positioned at the first landmark 202 for deriving the first cone of visibility 212. This can be derived in software or equivalent based upon the three-dimensional map 200 and information from the user's imaging device, such as for example pose parameters.

A second cone of visibility 216 extends from second landmark 206 and also encompasses a portion of escalator 210 and a portion of third floor 208. Thus if the imaging device lens is pointed in the direction of second landmark 206 while the device is located on any area within second cone of visibility 216, second landmark 206 would appear in a perspective view which is similar to that shown in FIG. 2 at reference numeral 218. Imaging device or camera pose parameters (generated and recorded while pointing the imaging device in the direction of second landmark 206) is used to derive second cone of visibility 216 in a manner similar to that described above with respect to the first cone of visibility 212.

An overlap region 220, i.e., the region where the first and second cones of visibility 212, 216 overlap, represents a refined or more accurate estimate of the location of the imaging device, and by inference its user. As explained elsewhere herein embodiments are described showing how an overlapping area can be identified in a three-dimensional model in a rapid manner, including in some implementations at a speed that approaches real time.

Figure 3A:
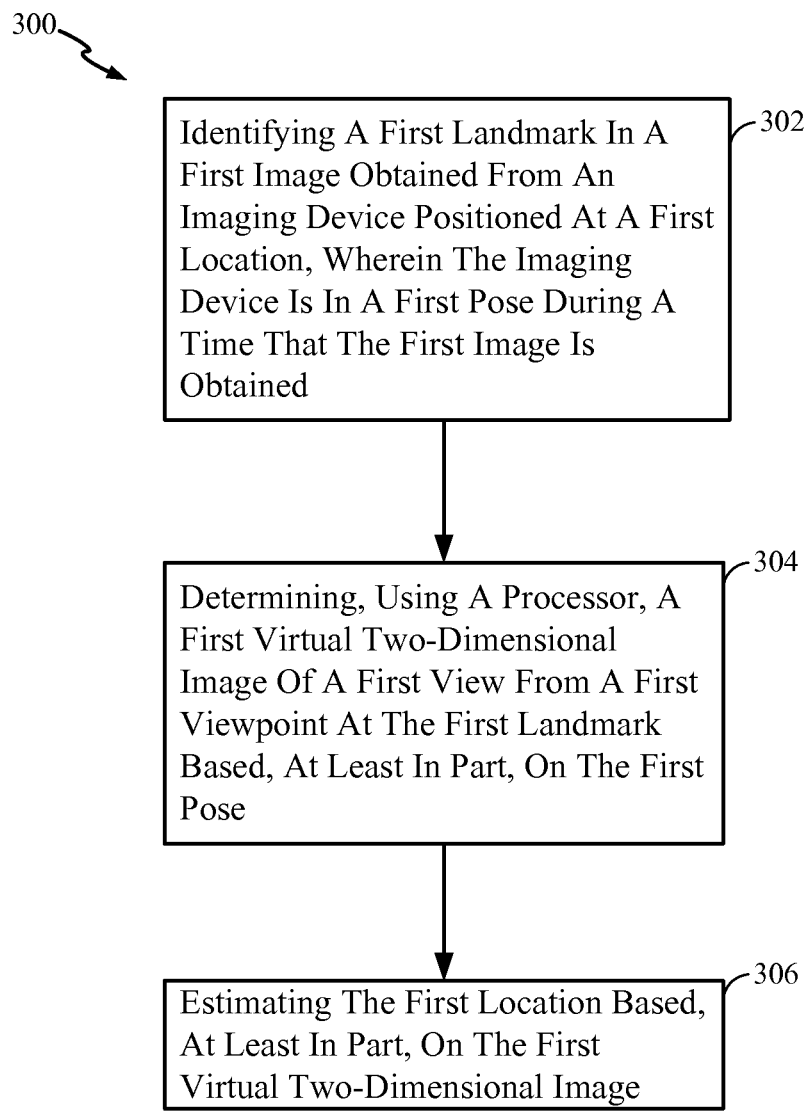
FIG. 3A is a simplified flow diagram of a method of an imaging device, according to an implementation.

FIG. 3A is a simplified flow diagram 300 of a method of determining a location of an imaging device, according to an implementation. This method may correspond to the processes described in FIGS. 1 and 2, as well as in FIGS. 4A-11B described in detail elsewhere herein. Claimed subject matter is not limited in scope to the particular order or arrangement of the stages shown. Likewise, additional stages may be included in an embodiment or stages depicting one or more operations in place of those shown may be used in an embodiment. In a particular implementation, a first landmark is identified in a first image obtained from an imaging device positioned at a first location, wherein the imaging device is in a first pose during a time that the first image is obtained. (Block 302) In some implementations, this identification may include a selection of the first landmark by a user, or alternatively may include a selection that occurs automatically. Using a processor, a first virtual two-dimensional image of a first view from a first viewpoint at the first landmark is determined based, at least in part, on the first pose. (Block 304) The first location of the imaging device is estimated based, at least in part, on the first virtual two-dimensional image. (Block 306)

Figure 3B:
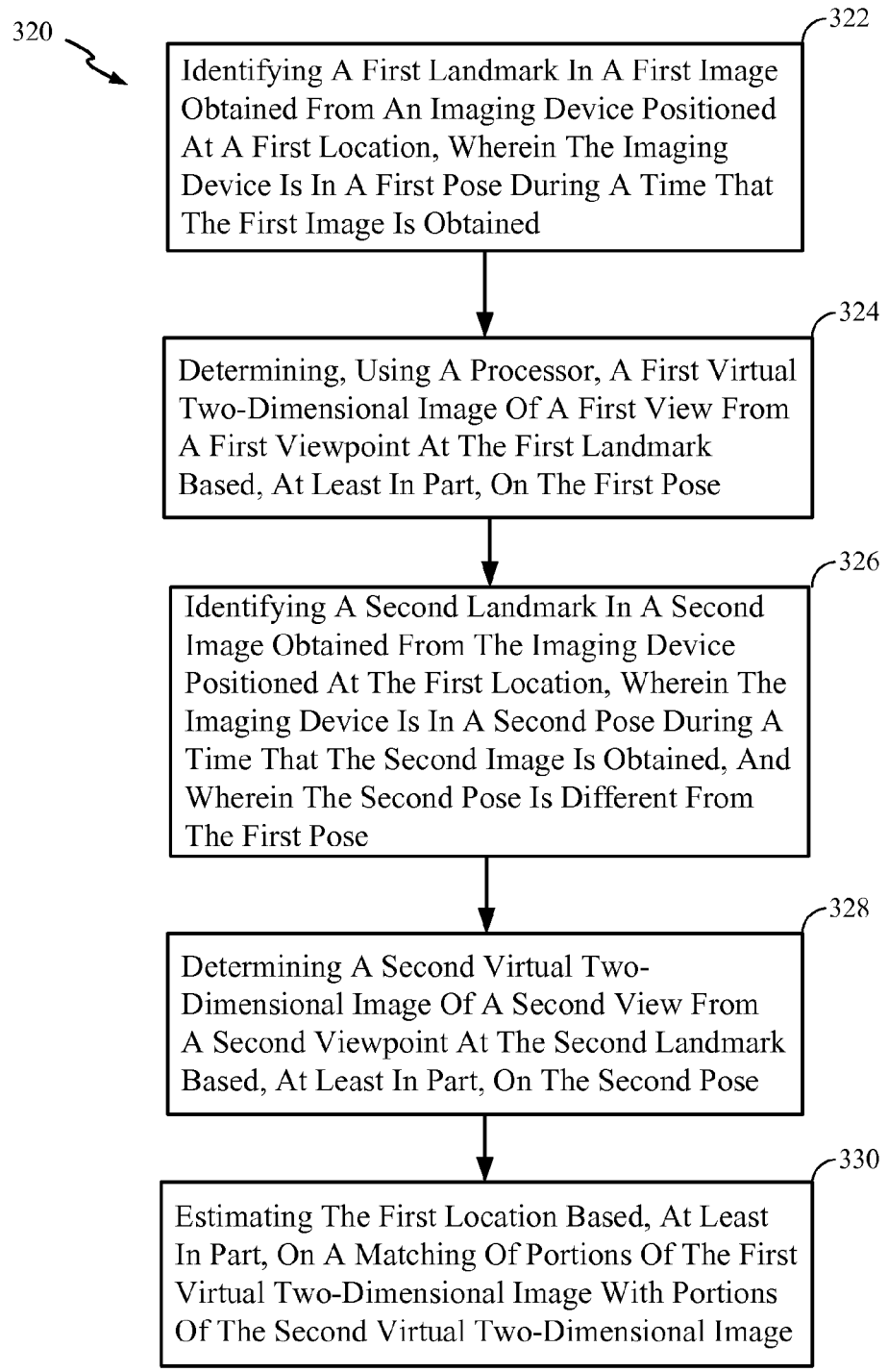
FIG. 3B is a simplified flow diagram of a method of an imaging device, according to an alternative implementation.

FIG. 3B is a simplified flow diagram 320 of a method of determining the location of an imaging device according to an alternative implementation wherein two landmarks are used for estimating position location. This method may correspond to the processes described in FIGS. 1 and 2, as well as in FIGS. 4A-11B described in detail elsewhere herein. Claimed subject matter is not limited in scope to the particular order or arrangement of the stages shown. Likewise, additional stages may be included in an embodiment or stages depicting one or more operations in place of those shown may be used in an embodiment. In a particular implementation, a first landmark is identified in a first image obtained from an imaging device positioned at a first location, wherein the imaging device is in a first pose during a time that the first image is obtained. (Block 322) In some implementations, this identification may include a selection of the first landmark by a user, or alternatively may include a selection that occurs automatically. Using a processor, a first virtual two-dimensional image of a first view from a first viewpoint at the first landmark is determined based, at least in part, on the first pose. (Block 324) A second landmark is identified in a second image obtained from the imaging device positioned at the first location, wherein the imaging device is in a second pose during a time that the second image is obtained, and wherein the second pose is different from the first pose. (Block 326) In some implementations, this identification may include a selection of the second landmark by a user, or alternatively may include a selection that occurs automatically. A second virtual two-dimensional image of a second view from a second viewpoint at the second landmark is determined based, at least in part, on the second pose. (Block 328)

While the implementation of FIG. 3B describes the use of two landmarks appearing in two images, in an alternative implementation the two landmarks may appear in a single image captured by a mobile imaging device. A selection or identification of each of the two landmarks may occur automatically. Accordingly a single set of pose parameters associated with the single image may be used to derive first and second virtual two-dimensional images associated with first and second views at the respective two landmarks.

In an implementation, the determination of first and second virtual two-dimensional images may include rendering them based, at least in part, on a three-dimensional representation of a region. In an implementation, the three-dimensional representation of the region may include a plurality of graphic primitives, wherein each one of the primitives has an attribute. In an implementation, the three-dimensional representation of the region is color-coded and the attribute is based, at least in part, on a value corresponding to the color coding. In other implementations, other attributes of the graphic primitives that are not based upon color coding may be used as well. One example of an alternative attribute may be the assignment of an attribute number to each primitive so that no two primitives have the same number. These attribute numbers may be computer-generated or derived on the basis of other than color-coding.

The first location of the imaging device is estimated based, at least in part, on a matching of portions of the first virtual two-dimensional image with portions of the second virtual two-dimensional image. (Block 330) In an implementation, this matching may include matching the attribute of at least one of the graphic primitives in the first virtual two-dimensional image with the attribute of at least one of the graphic primitives in the second virtual two-dimensional image.

Figure 4A:
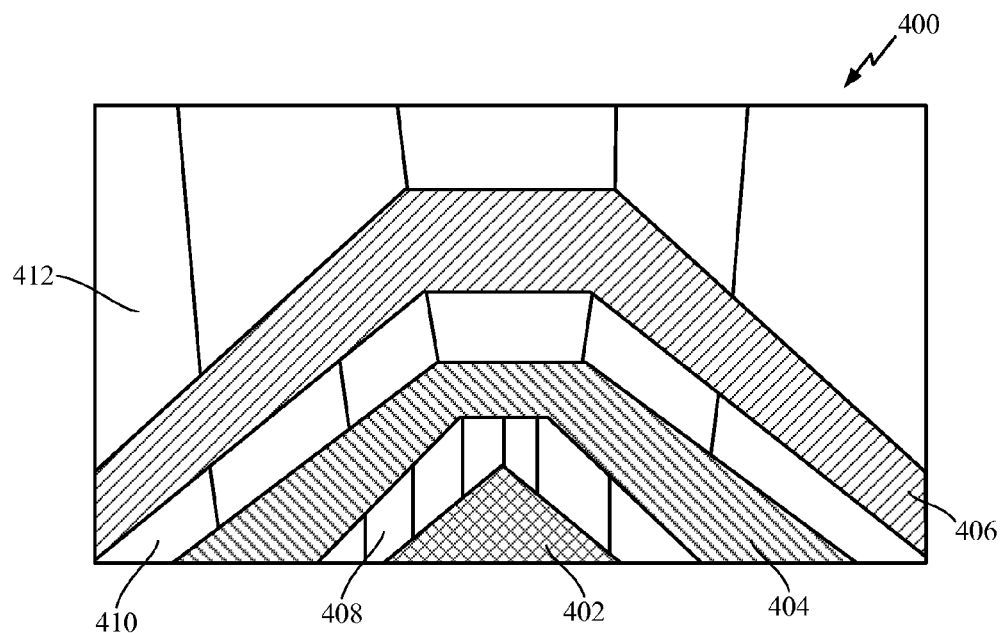
FIG. 4A is a simplified view of a three-dimensional model or map of a shopping mall venue according to an alternative implementation.
Figure 4B:
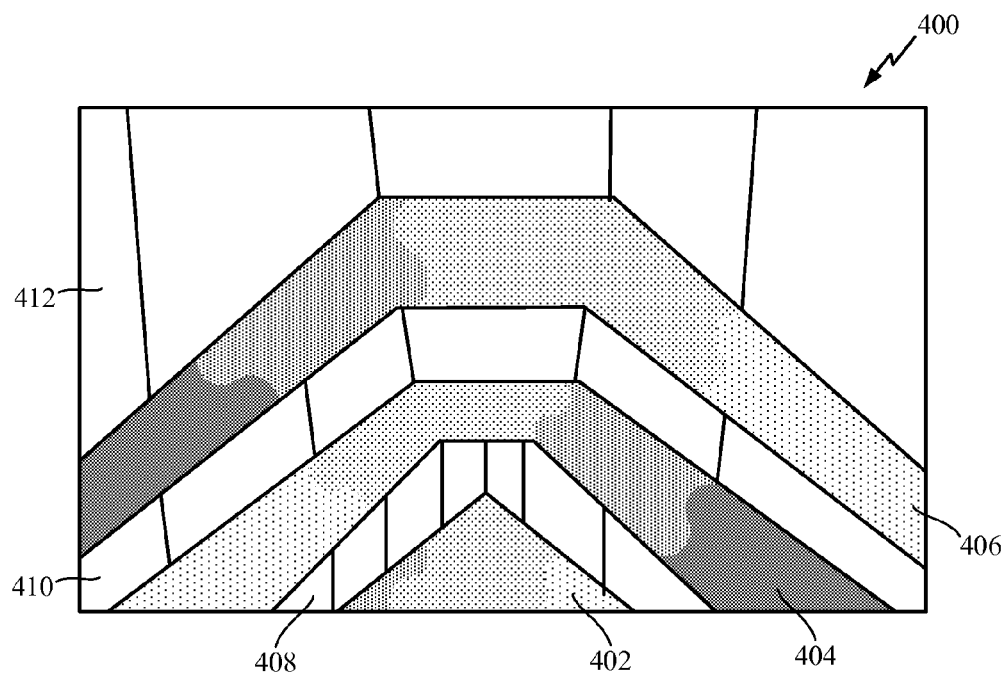
FIG. 4B is the model or map if FIG. 4A, but which has been color coded according to an implementation.

In an alternative implementation, FIG. 4A shows a three-dimensional representation of a region or model 400 of a venue, which in this case also is an indoor shopping mall. This three-dimensional model 400 is generated or rendered from a two-dimensional map of the mall having one or more landmarks with known locations. The three-dimensional model 400, includes a first floor 402, a second floor 404 and a third floor 406 which are disposed at different elevations or levels from one another. The model 400 further includes a first plurality of walls 408 extending upwardly from first floor 402, a second plurality of walls 410 extending upwardly from second floor 404, and a third plurality of walls 412 extending upwardly from third floor 406. As shown in FIG. 4B, certain areas or features of three-dimensional model 400 are color coded. These color coded areas correspond to locations where a mobile imaging device could potentially be located which in this case would be first, second and third floors 402, 404, 406. In other words, the walls may not be color coded since they are locations where a mobile imaging device likely could not be located. In an alternative implementation however all areas and features of three-dimensional model 400 may be color coded.

In the illustrated implementation however these floors are not color coded with uniform coloring. Moreover each of the floors is colored differently from one another. For example third floor 406 is color coded so that as the floor extends from right to left, the coloring begins as a relatively dark, solid orange color and then phases into progressively lighter shades of orange and then into a light orange-lime hue and then into progressively darker shades of lime or light green. Second floor 404 is color coded so that as the floor extends from right to left the coloring begins as a solid blue and then phases into progressively lighter shades of blue and then into a light blue-pink hue and then into progressively darker shades of pink. First floor 402 is color coded so that as the floor extends from right to left the coloring begins as a light aquamarine color and then phases into progressively lighter shades of aquamarine and then into a light red hue and then into progressively darker shades of red.

The foregoing is merely one implementation; other color selections may be used in other implementations so that a mixture and/or blending of various hues, tones, primary colors, tints, shades, intensity levels, saturations, brightness (value), and/or luminance (lightness) values is applied to each floor so that there is not a uniformity of color throughout each floor. As previously mentioned in the illustrated implementation the first, second and third pluralities of walls 408, 410, 412 are not color coded, since they typically represent areas where a mobile imaging device typically could not physically be located. In some implementations the walls are in grey-scale, or in one-bit, bi-tonal, black-and-white. In other implementations the walls are in a color, but in one that is different than the colors used for the floors, and moreover may be a color that is uniform throughout the walls so that they do not have the shadings and variations, etc. as previously described for the floors.

Figure 4C:
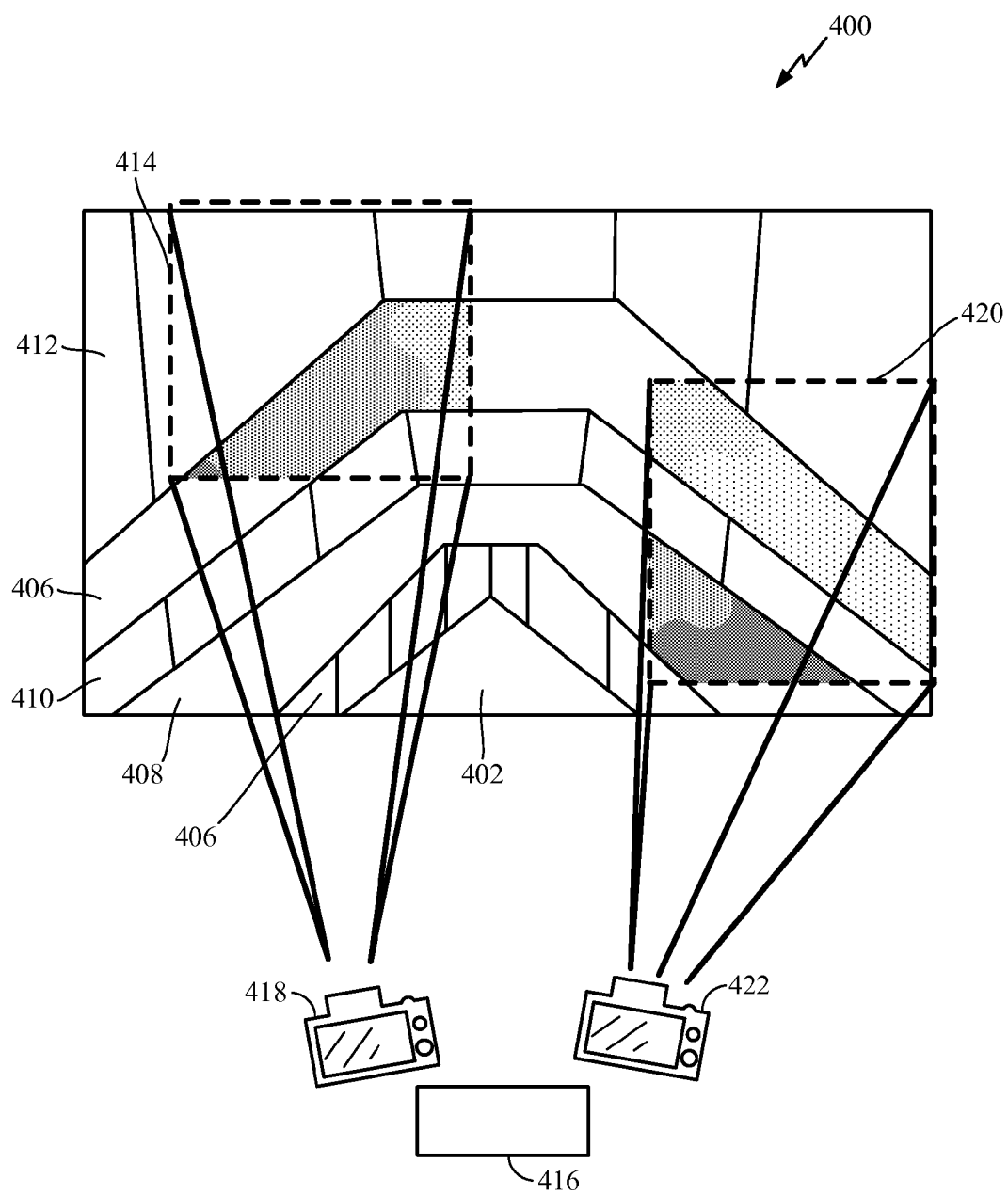
FIG. 4C is the model or map of FIG. 4B and further including areas of visibility according to an implementation.

As shown in FIG. 4C, a first area of visibility 414 in the three-dimensional model 400 encompasses a portion of the third floor 406, and portions of the second and third pluralities of walls 410, 412. This first area of visibility 414 is derived by receiving imaging device or camera pose parameters from an imaging device (not shown) located somewhere within first area of visibility 414 while the imaging device is pointed toward a landmark 416. First area of visibility 414, a portion of which may be color coded as previously described, is rendered from the three-dimensional model 400 into a virtual, two-dimensional image (not shown) using a graphics program or language such as, for example, the OpenGL (Open Graphics Library) application programming interface (API), e.g., using a first virtual camera 418 in OpenGL mode. In an implementation, this rendering is accomplished using a frame buffer. However because only the floor portion of first area of visibility 414 is color coded, it is determined by this coding that the user and his/her imaging device would be located somewhere on the color coded floor area of third floor 406 within first area of visibility 414 and not on the walls which are not color coded.

FIG. 4C also shows a second area of visibility 420 in the three-dimensional model 400. In this case second area of visibility 420 is derived by receiving imaging device or camera pose parameters from an imaging device (not shown) located somewhere within second area of visibility 420 while this imaging device is pointed in the direction of landmark 416. This could be either the same imaging device that previously was located within the first area of visibility 414 but had been relocated, or alternatively could be a different imaging device. Second area of visibility 420, a portion of which is color coded as described above, is rendered from the three-dimensional model 400 into a virtual, two-dimensional image using a second virtual camera 422. In an implementation, this rendering is accomplished using a frame buffer. As previously mentioned in this implementation, portions of the second and third floors 404, 406 are color coded; however no walls are color coded. Thus it is determined by this coding that the user and his/her imaging device could be located somewhere on the color coded floor areas of the second and third floors 404, 406 within the second area of visibility 420, but not on the walls which are not color coded. A location of an imaging device can be estimated to fall within a certain region or area based upon the imaging device or camera pose parameters generated when the imaging device is pointed in the direction of a landmark having a known location. Moreover as discussed in more detail elsewhere herein, the imaging device's location can be more precisely estimated in certain circumstances including for example an estimate as to whether the device is on second floor 404 or third floor 406.

FIGS. 5A, 5B and 5C illustrate the use of two landmarks and how they can be used to improve the accuracy of an estimate of an imaging device's location according to an implementation. FIG. 5A shows a three-dimensional representation of a region of another venue, which in this case also is an indoor shopping mall. The representation of the region, or model 500, includes a first floor 502, a second floor 504 and a third floor 506 which are at different levels or elevations from one another. Model 500 further includes a first plurality of walls 508 extending upwardly from first floor 502, a second plurality of walls 510 extending upwardly from second floor 504, and a third plurality of walls 512 extending upwardly from third floor 506. Certain areas or features of three-dimensional model 500 are color coded to correspond to locations where a mobile imaging device potentially could be located which in this case would be first, second and third floors 502, 504, 506. Although these floors are color coded, they are not uniformly colored. Rather each floor is colored so that a mixture and/or blending of various hues, tones, primary colors, tints, shades, intensity levels, saturations, brightness (value), and/or luminance (lightness) values is applied to each floor so that there is not a uniformity of color throughout the floor. In the illustrated implementation, first, second and third pluralities of walls 508, 510, 512 are not color coded, since they represent areas where a mobile imaging device typically could not physically be located.

As shown in FIG. 5B a first area of visibility 514 in the three-dimensional model 500 includes a portion of the third floor 506 and portions of the second and third pluralities of walls 510, 512. The first area of visibility 514 may be derived from a first virtual camera 516 at a first landmark 518 having a known location. This first area of visibility 514 may be generated from pose parameters provided by an imaging device (not shown) while the device is located somewhere in first area of visibility 514 and while pointing the device in the direction of first landmark 518. The first area of visibility 514 includes a portion of the third floor 506 which is color coded and portions of the second and third pluralities of walls 510, 512 which are not color coded.

As also shown in FIG. 5C a second area of visibility 520 in the three-dimensional model 500 includes a portion of third floor 506 and portions of the second and third pluralities of walls 510, 512. The second area of visibility 520 is derived from a second virtual camera 522 at a second landmark 524 having a known location that is different than the known location of first landmark 518. Second area of visibility 520 may be generated from pose parameters provided by the imaging device (not shown) while the device is located somewhere in second area of visibility 520 and while the imaging device is pointed in the direction of second landmark 524. Second area of visibility 520 includes a portion of the third floor 506 which is color coded and portions of the second and third pluralities of walls 510, 512 which are not color coded.

In both the first and second areas of visibility 514, 520 the color coding of third floor 506 may not be uniform according to the illustrated implementation. Rather variations in colors and shadings are used throughout third floor 506 for reasons discussed elsewhere herein. A determination is made where the coloring of the third floor 506 in first area of visibility 514 matches the coloring of the third floor 506 in second area of visibility 520. Those areas that correspond to a color match may represent an improvement in the accuracy of the estimated location of the imaging device and by inference its user. This is illustrated by a superimposed or overlap area 526 as shown in FIG. 5A where the first and second areas of visibility 514, 520 are illustrated to be within the larger three-dimensional map of the mall venue. Overlap area 526 may be smaller than either one of the first or second areas of visibility 514, 520 and therefore represents a refined or improved estimated location of the imaging device. However in some implementations it is not necessary to conduct an overlay like that shown at reference numeral 526 of FIG. 5A. For example, overlap may be determined from virtual images of the individual first and second views 514, 520 of FIGS. 5B and 5C which have been color coded and rendered into two dimensions, and then color matched to identify the smaller region (i.e., the overlap area 526) where the imaging device may be located.

Figure 6A:
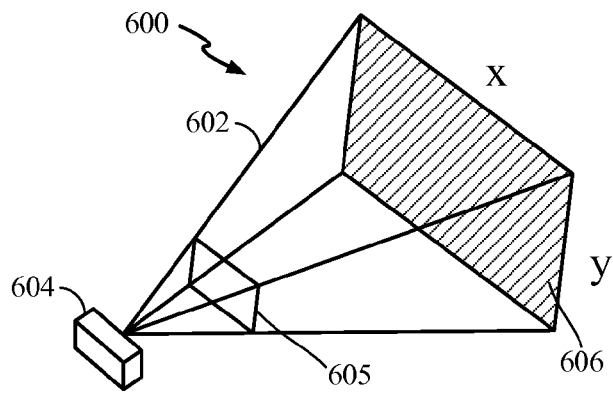
FIGS. 6A, 6B and 6C are simplified illustrations of the nature of certain information, including pose parameters, of an imaging device or camera according to an implementation.
Figure 6B:
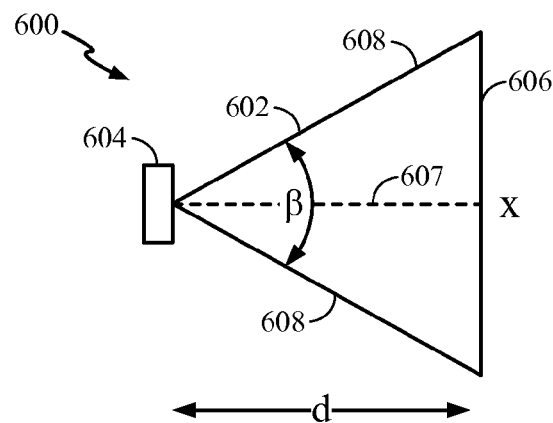
Figure 6C:
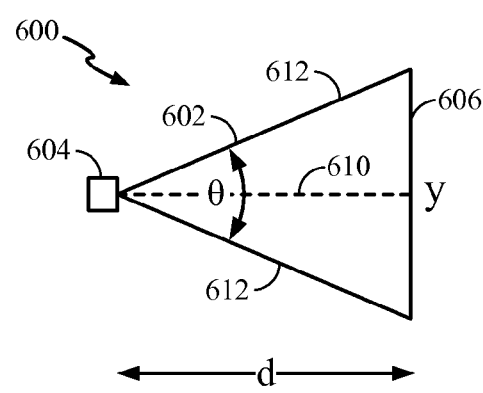

FIGS. 6A, 6B and 6C are simplified illustrations 600 of the nature of certain information, including pose parameters, of an imaging device or camera according to an implementation. Certain of this information can be provided for use by known graphics programs or languages, such as for example, the OpenGL API, so that they may render three-dimensional scenes into two-dimensional images. FIG. 6A shows a perspective view of a viewing frustum 602 extending from an imaging device 604 according to an implementation. The viewing frustum 602 has a near clipping plane 605 and a far clipping plane 606. The far clipping plane 606 is generally rectangular in shape and includes a generally horizontal length, x, and a generally vertical height, y. The aspect ratio (r) of the viewing frustum 602 is the ratio of the length, x, and the height, y, and can be represented according to expression (1) as follows:

$$r=(x/y) \quad (1)$$

The aspect ratio r is a parameter that can be used for setting up a virtual perspective camera in OpenGL, for example. The aspect ratio r can be obtained from a real camera in a mobile device (e.g., an aspect ratio of a captured camera image.)

FIG. 6B is a two-dimensional top plan view of FIG. 6A with the near clipping plane removed for clarity. A line represented by the broken line at reference numeral 607 extends perpendicularly from the far clipping plane 606 to the location of the imaging device 604 thus defining two right triangles. This perpendicular line 607 has a length d that corresponds to the distance from the far clipping plane 606 to the imaging device 604. Each right triangle has a hypotenuse 608 which forms part of the boundaries of the viewing frustum 602 and which intersects with the other hypotenuse 608 at the location of the imaging device 604 thereby defining an angle β which is the view angle of the imaging device 604 or camera. This angle β is a pose parameter that can be obtained or estimated from a real camera in a mobile device, for example. Accordingly this view angle β can be represented as a function of the length d of the perpendicular line 607 and the width x of the viewing frustum 602 according to expression (2) as follows:

$$\tan(\beta/2)=(x/2)/d \quad (2)$$

FIG. 6C is a two-dimensional side plan view of FIG. 6A with the near clipping plane removed for clarity according to an implementation. A line represented by a second broken line having reference numeral 610 extends perpendicularly from the far clipping plane 606 to the location of the imaging device 604 thus defining another set of two right triangles. This perpendicular line 610 also has the length d which has the same magnitude as the length d of the perpendicular line 607 of FIG. 6B. Each right triangle has a hypotenuse 612 which forms part of the boundaries of the viewing frustum 602 and which intersects with the other hypotenuse 612 at the location of the imaging device 604 thereby defining a second angle θ. This second angle θ is a parameter (i.e., field of view) for setting up a virtual perspective camera in OpenGL API. Accordingly the second angle θ can be represented as a function of the length, d, of the perpendicular line 610 and the height y of the viewing frustum 602 according to expression (3) as follows:

$$\tan(\theta/2)=(y/2)/d \qquad (3)$$

In order to use OpenGL according to an implementation, the aspect ratio r of the camera or imaging device 604 and the second angle θ of FIG. 6C can be provided to the OpenGL API. On the other hand the view angle β of FIG. 6B can be obtained from the pose data of the imaging device. Therefore the second angle θ of FIG. 6C can be mathematically derived from expressions (1), (2) and (3) so that the second angle θ can be expressed as a function of the view angle β and the aspect ratio r in expression (4) as follows:

$$\tan(\theta/2)=(\tan(\beta/2))*1/r \qquad (4)$$

Thus the second angle θ of FIG. 6C can be determined based upon the imaging device view angle β and the aspect ratio r so that the second angle θ of FIG. 6C and the aspect ratio r can be used to set up a virtual perspective camera in OpenGL in order to render the three-dimensional model into a two-dimensional virtual image and in order to determine an area or cone of visibility for the imaging device location. The foregoing is an example of one use of OpenGL, however, and alternative implementations may use other features of OpenGL or use other API's.

Figure 7A:
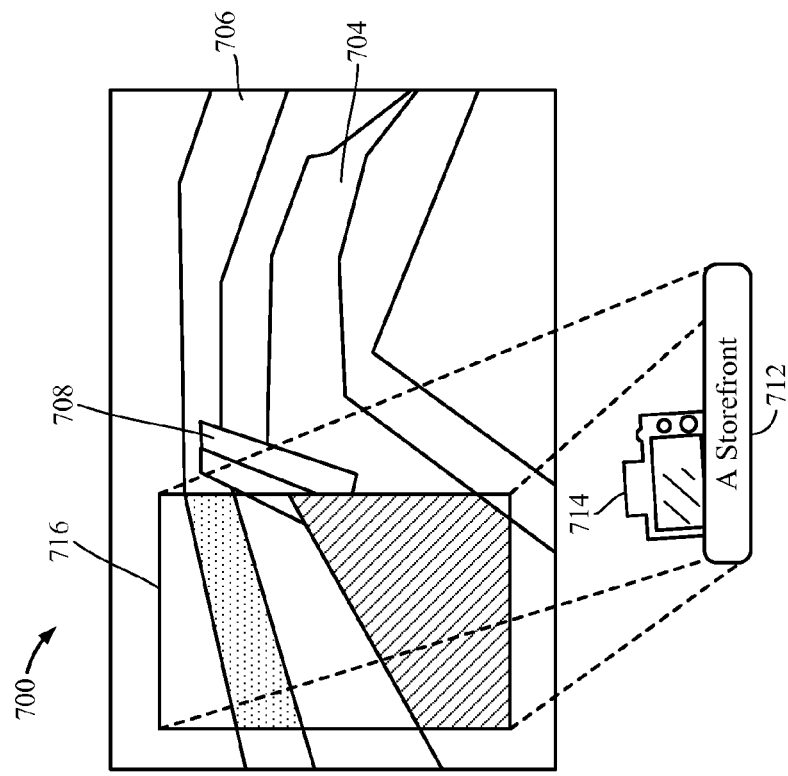
FIGS. 7A and 7B are simplified illustrations of cones of visibility within a venue according to an implementation.
Figure 7B:
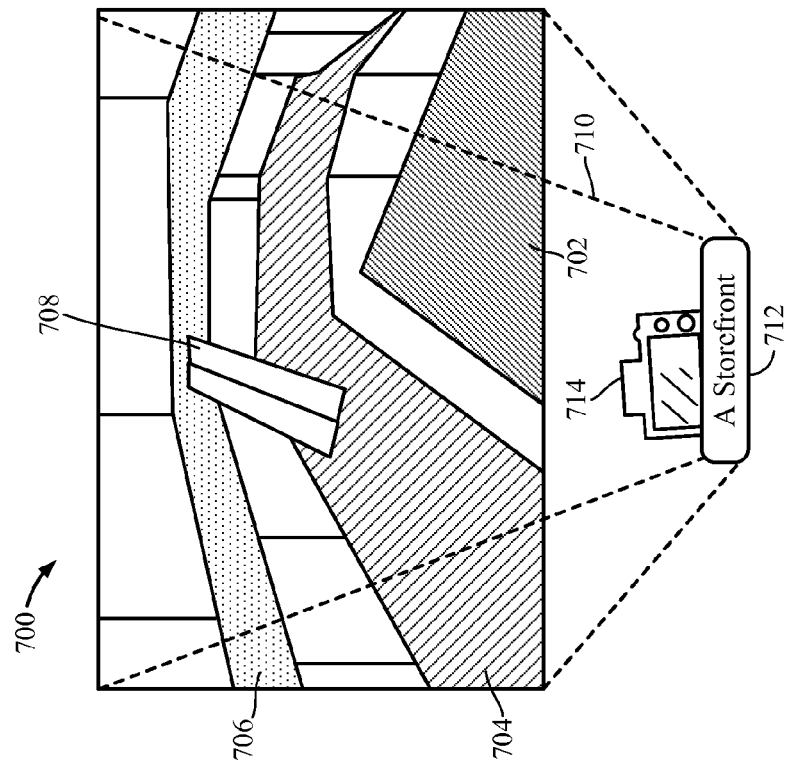

FIGS. 7A and 7B are simplified illustrations showing how the range of the estimated view angle can affect a cone or area of visibility according to an implementation. FIG. 7A illustrates a three-dimensional model 700 or map of a shopping mall venue having a first floor 702, a second floor 704, a third floor 706 and an escalator 708 connecting the second and third floors 704, 706. A first area of visibility 710 extends from a storefront 712 having a known location, i.e., a landmark, and encompasses portions of the first, second and third floors 702, 704, 706 as well as the entirety of the escalator 708. Thus if an imaging device lens (not shown) is pointed in the direction of the storefront 712 while the device is disposed at any location within the first area of visibility 710, imaging device pose parameters may be used to derive this first area of visibility 710 in this three-dimensional model 700 as would be viewed from the perspective of the storefront 712 and rendered using known graphics programs or languages, such as for example, OpenGL according to an implementation. The size of in the first area of visibility 710 is based at least in part on an imaging device view angle of minus 10° (−10°) with an error range of −35° to +35° in both the horizontal and vertical directions.

FIG. 7B illustrates the three-dimensional model 700 of the same shopping mall venue that is shown as in FIG. 7A according to an implementation. A second area of visibility 716 extends from the same storefront 712 and encompasses portions of the second and third floors 704, 706, as well as a portion of the escalator 708. If an imaging device lens (not shown) is pointed in the direction of the storefront 712 while the device is disposed in any location within the second area of visibility 716, the pose parameters of the device could be used to derive the second area of visibility 716 in the three-dimensional model 700 from the perspective of the storefront 712. In the case of FIG. 7B however the imaging device with a view angle having a smaller error is used. In this case the area is based at least in part on an imaging device view angle of minus 10° (−10° with a range between only −5° to +5° in both the horizontal and vertical directions. Thus as can be seen, second area of visibility 716 of FIG. 7B (e.g., the area within the venue where the imaging device potentially could be located) is significantly smaller than the first area of visibility 710 of FIG. 7A.

FIG. 8 illustrates details of certain color coding and image processing according to an embodiment. Shown is a perspective view of a simplified three-dimensional model 800 of a scene which includes a portion of a first floor 802 on a first level or elevation and a portion of a second floor 804 on a second level or elevation that is different than the first level. A portion of a cone of visibility 806 extends from a landmark 808 toward first and second floors 802, 804. Cone of visibility 806 represents a view as seen from the landmark 808 and generated by a virtual camera (not shown). First and second floors 802, 804 are tessellated (e.g., tiled) into a plurality of graphic primitives 810 which in the illustrated embodiment are rectangles. In other embodiments however other shapes, lines, elements or polygons may be used as graphic primitives. The size of the graphic primitives can be based upon the desired granularity of the model which in turn can affect the position estimation accuracy. Thus if the accuracy of an estimate of a user's position is relatively unimportant to a user, then the size of the graphic primitives may be established to be relatively large. Advantageously this may require fewer computations (and less time) to achieve the position estimation. On the other hand if the accuracy of an estimate of a user's position is more important, then the size of the graphic primitives may be constrained to be relatively small. However as a possible disadvantage this may require a greater number of computations to achieve the position estimation which may result in more time to achieve the estimation.

Graphic primitives 810 have attributes for use in identification of a selected one or more of graphic primitives 810 as described in more detail elsewhere herein. In the implementation of FIG. 8, the attributes are based, at least in part, on values corresponding to a color coding of the graphic primitives 810. Accordingly, first and second floors 802, 804 are color coded. However the color coding of the floors may not be uniform. That is, each floor may be colored so that a mixture and/or blending of various hues, tones, primary colors, tints, shades, intensity levels, saturations, brightness (value), and/or luminance (lightness) values is applied to the floor so that there is not a uniformity of color throughout the floor. Accordingly a graphic primitive may be assigned a unique color or mix of colors which in turn may be used to determine an identification of graphic primitive 810, such as for example an identification number. While the floors may be color coded as previously described, the walls, partitions and other areas may not be colored at all, or alternatively, may be colored so that they all have the same color that is different than the color coding of the floors. Three-dimensional model 800 further includes a plurality of walls 812 extending upwardly from middle portions of first and second floors 802, 804. According to the illustrated implementation, the plurality of walls 812 may not be tessellated but may be color coded so that they all have the same color which is uniform and which is different than the colors of the floors.

According to an implementation, when the three-dimensional model 800 is rendered into two dimensions, it may be a flat rendering without any lighting or shading effects. Moreover if this is rendered based upon an imaging device view and pose parameters, an identity of only those parts of the first and second floors 801, 804 on which an imaging device may be visible from the perspective of the landmark 808 can be identified. According to an implementation, the uniform coloring of the plurality of the walls may be used to determine portions of the first and second floors (e.g., those specific graphic primitives) that are disposed "behind" the walls (with respect to the virtual camera located at the landmark 808) such that they may block the view of any imaging device that otherwise would be located behind them. This in turn may be an identification of certain areas of the first and second floors where an imaging device would not be located.

According to an implementation, the attributes of the graphic primitives may be based, at least in part, on a plurality of RGB triplet values according to the RGB color model. These values may be converted to an index for the graphic primitives in a three-dimensional model which corresponds to a physical location in the real world. Thus RGB triplet values can be used to generate a unique identification number for each graphic primitive. By examining an RGB color value for a pixel, this can be losslessly converted back to integers which can be a basis for an index for the graphic primitive. Thus in some implementations, graphics hardware is used to find visible graphic primitives or polygons in a scene. As previously mentioned only the features in the scene where an imaging device potentially can be located are color coded. Color coding is advantageous in that some implementations employ the OpenGL API and a graphics pipeline, which is a combination that can be configured to perform this color coding relatively easily and rapidly. One goal is to render a three-dimensional image, and this graphics pipeline can easily use color. For example in three-dimensions it normally is relatively easy to determine which parts of a scene constitute the floors, but in some two-dimensional images it can be more difficult to distinguish floors from walls. In three-dimensions therefore it often is useful to assign colors to floors that are different than the colors (or lack of color) used for walls, so that if a three-dimensional scene is rendered into two-dimensions, it may be easier to differentiate walls from floors in the two-dimensional scene.

Figure 9:
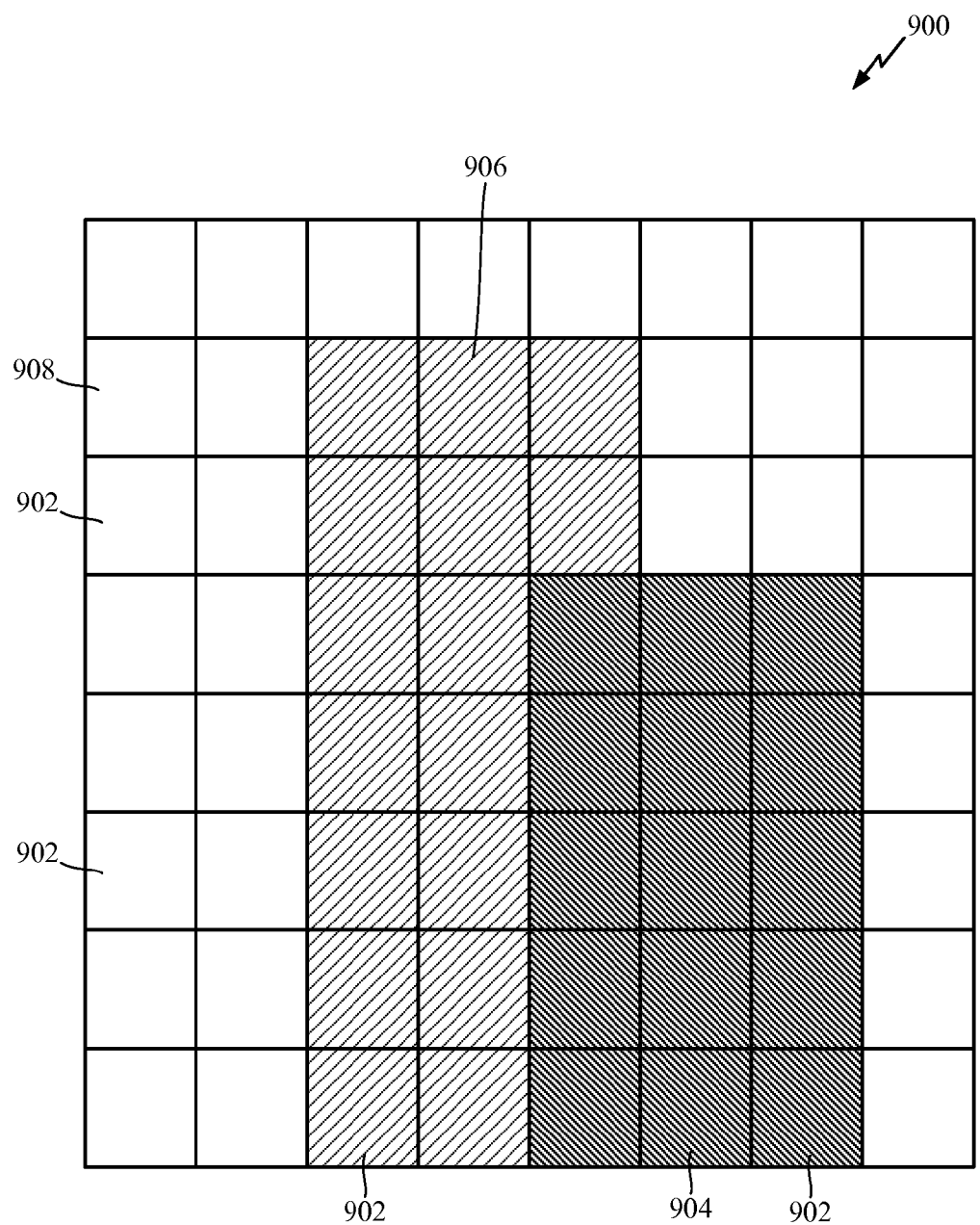
FIG. 9 is a simplified illustration of a pixel block according to an implementation.

FIG. 9 shows an 8×8 pixel block 900 which forms a portion of a frame buffer according to an implementation. The pixel block 900 includes a plurality of sixty four (64) pixels 902, each of which has a color according to the RGB color model. In FIG. 9 a first group of pixels 904 within the pixel block 900 may be color coded with a red color having the highest intensity of red and having no other color components. In an RGB color model, this may correspond to a RGB triplet value of 255, 0, 0. An identification number (ID) may be generated from the pixels in this first group 904 by decoding the pixel's RGB value. According to one implementation, this decoding may be accomplished using a formula such as expression (5) as follows:

$$ID = R + G*256 + B*256*256 \quad (5)$$

where R comprises an integer between 0 and 255 corresponding to an intensity level of red color, G comprises an integer between 0 and 255 corresponding to an intensity level of green color, and B comprises an integer between 0 and 255 corresponding to an intensity level of blue color. Using expression (5) an identification number for this first group of pixels may be 255+0*256+0*256*256, or 255+0+0, or 255. Thus pixels in the first group 904 may be assigned an identification number 255.

Still referring to FIG. 9, a second group of pixels 906 may be color coded with a blue color having a highest intensity of blue and having no other color components thus corresponding to a RGB triplet value of 0, 0, 255. Again using expression (5) an identification number for this second group may be 0+0*256+255*256*256, or 0+0+16,711,680, or 16,711,680. Thus pixels in the second group 906 may be assigned the identification number 16,711,680. Finally a third group of pixels 908 may be color coded with a white color corresponding to a RGB triplet value of 255, 255, 255 in the RGB model. Using expression (5) an identification number for this third group may be 255+255*256+255*256*256, or 255+65,280+ 16,711,680, or 16,777,215. Thus pixels in the third group 908 may be assigned the identification number 16,777,215. While the foregoing illustrates a method for generating an identification number using expression (5), alternative implementations may use other formulas, expressions or methods for generating identification numbers based upon RGB triplet values.

The embodiment of FIG. 9 illustrates pixel block 900 having first, second and third groups of pixels 904, 906, 908 which comprise respectively 15 pixels, 16 pixels and 33 pixels. However alternative embodiments may include one or more pixel blocks, each one of which has a greater or lesser number of groups of pixels. Each of those groups of pixels, in turn, may include a greater or lesser number of individual pixels. For example an alternative embodiment may include a pixel block comprised of only one group of pixels, all of which are of a particular color. In yet another alternative embodiment a pixel block may include only one pixel having a particular color while the pixel block further includes one or more groups of pixels having other, different colors than the color of the single pixel.

A graphic primitive in a frame buffer may comprise a plurality of contiguous pixels, each of which can have an identification value that can be determined as described above or that can be determined by other formulas, expressions or methods. A plurality of pixel identification values (that correspond to the plurality of pixels in a graphic primitive) in turn can be used to generate an identification value for the overall graphic primitive using any one or more mathematical operations or formulas operating on the individual pixel identification values. Accordingly a graphic primitive in the frame buffer may be assigned an identification value which can be indexed to its corresponding graphic primitive. Because areas in a scene where a mobile imaging device may be located (e.g., the floors) are color coded with non-uniform coloring as described elsewhere herein, an identification value of a graphic primitive may be unique to that graphic primitive.

In still further alternative implementations, the generating of identification numbers based upon attributes of the graphic primitives need not be performed according to the RGB model, but instead can be based upon other color models, color systems, or color spaces wherein colors can be represented by numbers. The RGBA model, the CYMK model, the CIE XYZ color space, and the YUV color space are a few such examples. Moreover alternative implementations need not be color-based at all. Rather other methods or systems that generate graphic primitive attributes or identification numbers for assignment to the graphic primitives may be used as well.

Figure 10:
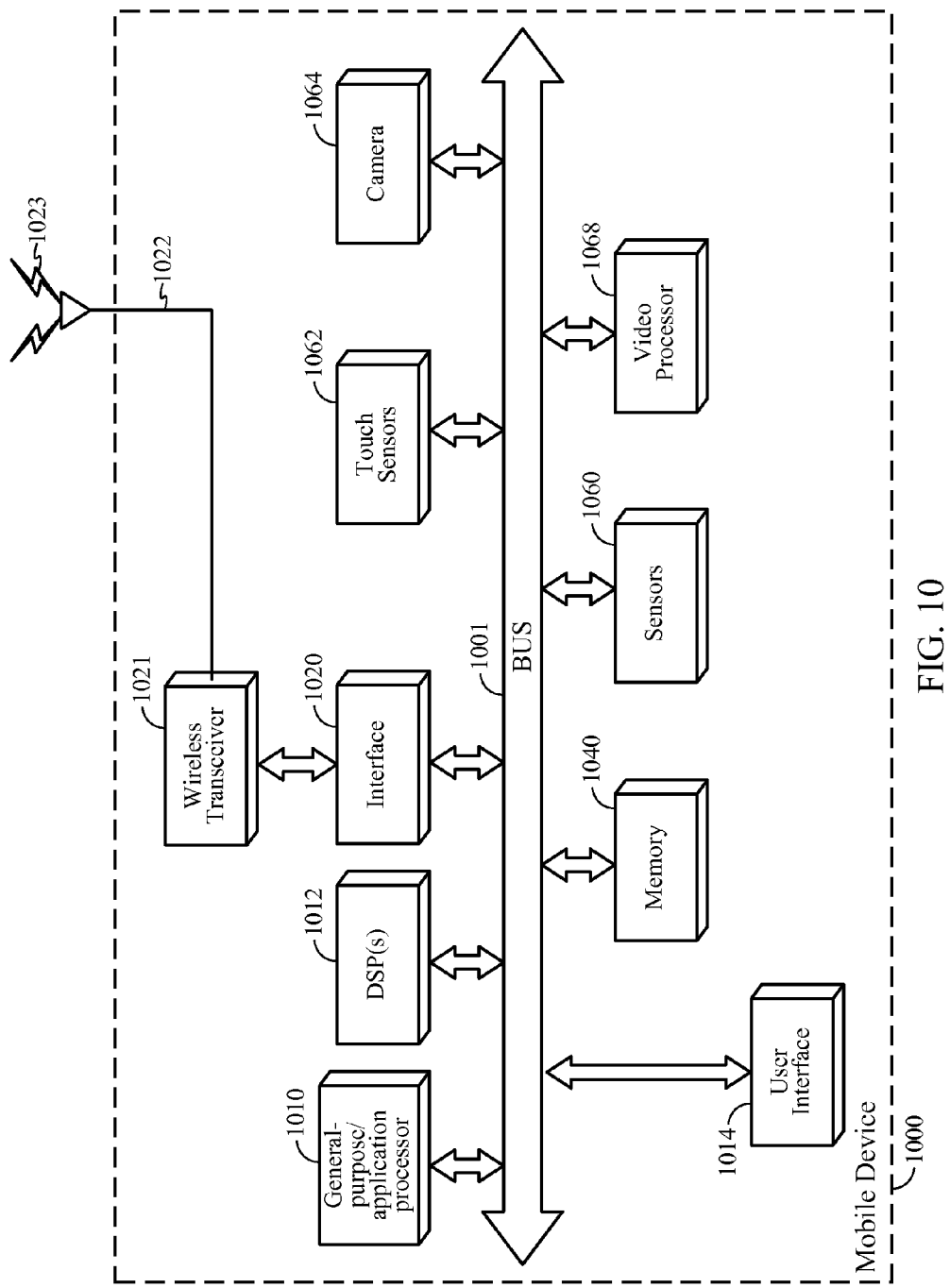
FIG. 10 is a schematic diagram of a mobile device 1000 according to an implementation.

FIG. 10 is a schematic diagram of a mobile device 1000 according to an embodiment. Mobile device 160 of FIG. 1 may comprise one or more features of mobile device 1000 shown in FIG. 10. In certain embodiments, mobile device 1000 can include a wireless transceiver 1021 which is capable of transmitting and receiving wireless signals 1023 via a wireless antenna 1022 over a wireless communication network. The wireless transceiver 1021 may be connected to a bus 1001 by a wireless transceiver bus interface 1020. In some embodiments the wireless transceiver bus interface 1020 may be at least partially integrated with the wireless transceiver 1021. Some embodiments may include multiple wireless transceivers and wireless antennas to enable transmitting and/or receiving signals according to corresponding multiple wireless communication standards such as, for example, versions of IEEE Std. 802.11, CDMA, WCDMA, LTE, UMTS, GSM, AMPS, Zigbee and Bluetooth, just to name a few examples.

Digital signal processor(s) (DSP(s)) 1012 are connected to the bus 1001 by a bus interface (not shown). Similarly general-purpose processor(s) 1010 can be connected to the bus 1001 by a bus interface (not shown). Alternatively the bus interface may be integrated with the DSP(s) 1012, or the general-purpose processor(s) 1010. In various embodiments, functions may be performed in response to the execution of one or more machine-readable instructions stored in a memory 1040 such as on a computer-readable storage medium, such as RAM, ROM, FLASH, or disc drive, just to name a few example. The one or more instructions may be executable by the general-purpose processor(s) 1010, specialized processors (not shown), or the DSP(s) 1012. The memory 1040 may comprise a non-transitory processor-readable memory and/or a computer-readable memory that stores software code (programming code, instructions, etc.) that are executable by the processor(s) 1010 and/or the DSP(s) 1012 to perform functions described herein.

Also shown in FIG. 10 is a user interface 1014 that may comprise any one of several devices such as, for example, a speaker, microphone, display device, vibration device, keyboard, touch screen, just to name a few examples. In a particular implementation, the user interface 1014 may enable a user to interact with one or more applications hosted on mobile device 1000. For example, devices of the user interface 1014 may store analog or digital signals on the memory 1040 to be further processed by the DSP(s) 1012 or the general purpose processor 1011 in response to an action from a user. Similarly, applications hosted on mobile device 1000 may store analog or digital signals on the memory 1040 to present an output signal to a user. In another implementation, mobile device 1000 may comprise touch sensors 1062 responsive to touching or pressure on a keyboard or touch screen device.

Mobile device 1000 also comprises a dedicated camera device 1064 for capturing still or moving imagery. The camera device 1064 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at the general purpose/application processor 1011 or the DSP(s) 1012. Alternatively, a dedicated video processor 1068 may perform conditioning, encoding, compression or manipulation of signals representing captured images. Additionally, the video processor 1068 may decode/decompress stored image data for presentation on a display device (not shown) on mobile device 1000.

Mobile device 1000 also comprises sensors 1060 coupled to the bus 1001 which may include, for example, inertial sensors and environment sensors. Inertial sensors may comprise, for example accelerometers (e.g., collectively responding to acceleration of mobile device 1000 in three dimensions), one or more gyroscopes or one or more magnetometers (e.g., to support one or more compass applications). Environment sensors of mobile device 1000 may comprise, for example, temperature sensors, barometric pressure sensors, ambient light sensors, camera imagers, microphones, just to name few examples. Sensors 1060 may generate analog or digital signals that may be stored in the memory 1040 and processed by the DPS(s) 1012 or the general purpose application processor 1011 in support of one or more applications such as, for example, applications directed to positioning or navigation operations. Moreover sensors 1060 may provide signals from which pose parameters may be derived for mobile device 1000.

In a particular implementation, a two-dimensional digital map of an indoor area may be stored in a particular format in the memory 1040. The digital map may have been obtained from messages containing navigation assistance data from a remote server. In one implementation, a mobile device may further apply crowd sourced data (e.g., obtained from a location server) to confirm an inference of an egress segment. For example, if there is a history of mobile devices moving through a feature presumed to be an egress segment, the feature may be confirmed as providing an egress segment. A three-dimensional model or map of the indoor area may be rendered from the two-dimensional map. Certain portions of the three-dimensional model may be selectively rendered so that these portions are tessellated into graphic primitives having attributes such as, for example, attributes that are based at least in part on a color coding of the primitives. These portions of the three-dimensional model may be rendered into a virtual two-dimensional image for use in estimating a position of mobile device 1000 as described in more detail elsewhere herein.

Mobile device 160 of FIG. 1 or mobile device 1100 of FIG. 10 can comprise an imaging device that may be used for estimating its position using one or more landmarks having a known position. Alternatively the imaging device may comprise a dedicated camera or any other device having a lens device for capturing images and having a processor. The estimation of a position using one or more landmarks pursuant to embodiments of claimed subject matter may be especially useful in venues where the landmarks are located on different levels, floors or elevations from each other or from the location of the imaging device. Examples of such venues include buildings such as, for example, shopping malls, hotels, hospitals and office structures having atriums, as well as airport terminals, sports stadiums and live entertainment arenas, just to name a few examples.

In some implementations, two-dimensional or three-dimensional images are produced or rendered rapidly which in some instances can approach real time speed. Commands are sent to a graphics accelerator using a library or API, such as OpenGL for example. A graphics driver can translate those commands to instructions for a graphics processing unit (GPU). The GPU uses those instructions to compute rasterized results which are transformed to a frame buffer as a rectangular block of pixels. A signal from the frame buffer is then produced as an output signal to a video display.

Figure 11A:
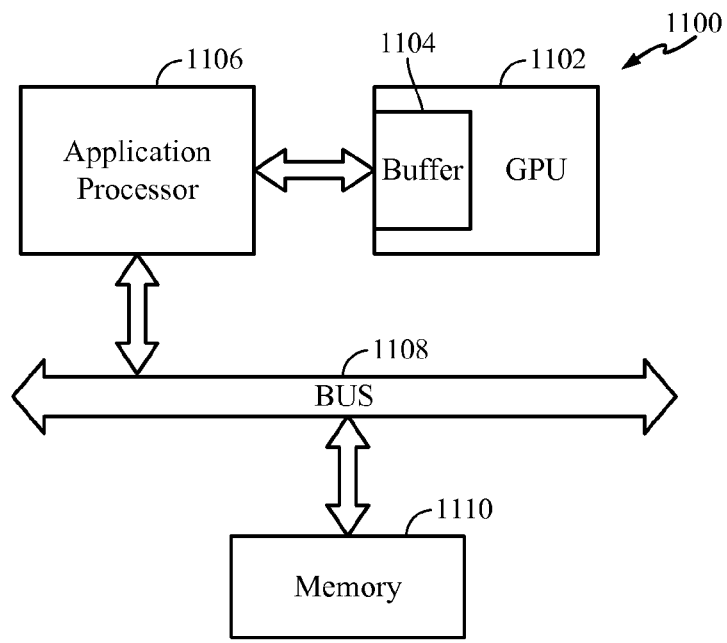
FIG. 11A is a schematic diagram showing a graphics processing unit (GPU) and its relationship to certain system components according to an implementation.

FIG. 11A is a schematic diagram 1100 showing a GPU 1102 and its relationship to certain other system components according to one implementation. Integrated within the GPU 1102 is a frame buffer 1104 which is at least a portion of an integrated memory of the GPU 1102. The GPU 1102 communicates directly with a general purpose/application processor 1106 which in turn communicates with a system bus 1108. In various embodiments, functions may be performed by the general purpose/application processor 1106 in response to execution of one or more machine-readable instructions stored in a memory 1110 which is in communication with the bus 1108. The memory 1110 may be similar to the memory 1040 of FIG. 10.

Figure 11B:
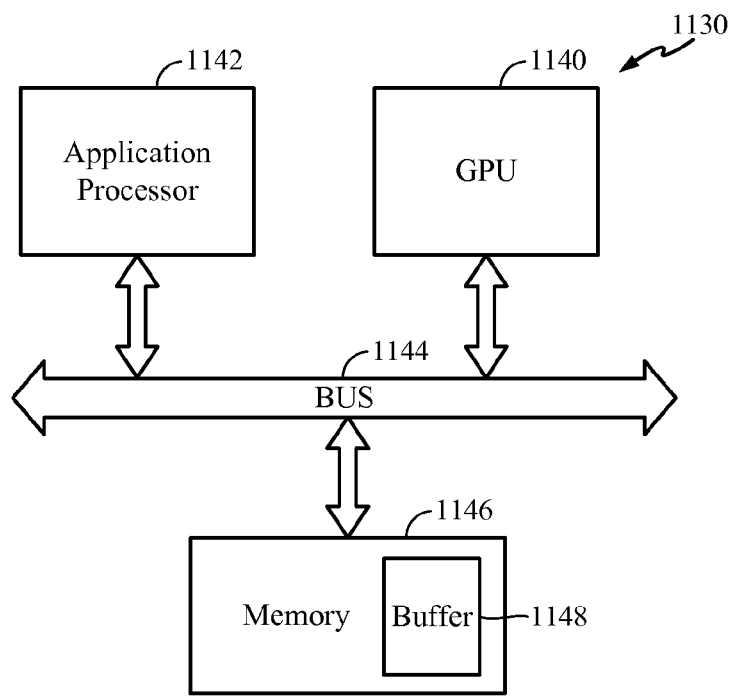
FIG. 11B is a schematic diagram showing a GPU and its relationship to certain system components according to an alternative implementation.

FIG. 11B is a schematic diagram 1130 showing a GPU 1140 and its relationship to certain other system components according to an alternative implementation. A general purpose/application processor 1142 communicates with a system bus 1144 as does the GPU 1140. Thus communications between the general purpose/application processor 1142 and the GPU 1140 are conducted via the bus 1144. Functions may be performed by the general purpose/application processor 1142 and the GPU 1140 in response to execution of one or more machine-readable instructions stored in a memory 1146 which also is in communication with the bus 1144. Integrated within the memory 1146 is a frame buffer 1148. In other respects however the memory 1146 may be similar to the memory 1040 of FIG. 10.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards.

A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femto cell, utilized to extend cellular telephone service into a business or home. In such an implementation, one or more mobile devices may communicate with a femto cell via a code division multiple access ("CDMA") cellular communication protocol, for example, and the femto cell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

In view of the above, it will be appreciated that certain embodiments overcome many of the long-standing problems in the art by providing a system, method and product for estimating the location of an imaging device. Using a three-dimensional map or model of a venue, certain areas of the venue are color coded and tessellated into graphic primitives according to one implementation. They are the areas on which the imaging device potentially could be located, such as for example floors, escalators, etc. The lens of the imaging device are pointed in the direction of one of the landmarks at the venue having a known location (such as a store front or a store sign, for example) while the corresponding pose of the imaging device is recorded. Using the pose parameters a selected view or portion of the three-dimensional venue map is rendered into a virtual, two-dimension image according to an implementation. This selected view corresponds to a line of sight, visible area where the imaging device could be located. According to an implementation, the color coding of the graphic primitives is used to derive or estimate an area on the map where the imaging device (and by inference its user) may be located.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method for determining a location comprising:
   identifying a first landmark in a first image obtained from an imaging device positioned at a first location, wherein the imaging device is in a first pose during a time that the first image is obtained;
   determining, using a processor, a first virtual two-dimensional image of a first view from a first viewpoint at the first landmark based, at least in part, on the first pose;
   estimating the first location based, at least in part, on the first virtual two-dimensional image;
   identifying a second landmark in a second image obtained from the imaging device positioned at the first location, wherein the imaging device is in a second pose during a time that the second image is obtained, and wherein the second pose is different from the first pose; and
   determining a second virtual two-dimensional image of a second view from a second viewpoint at the second landmark based, at least in part, on the second pose,
   wherein the estimating of the first location includes estimating the first location based, at least in part, on a matching of portions of the first virtual two-dimensional image with portions of the second virtual two-dimensional image.

2. The method of claim 1, wherein the estimating of the first location is based, at least in part, on a selection of portions of the first virtual two-dimensional image.

3. The method of claim 1, wherein the determining of the first virtual two-dimensional image is based, at least in part, on a three-dimensional representation of a region having a plurality of graphic primitives, wherein each one of the plurality of graphic primitives has an attribute.

4. The method of claim 1, wherein the determining of the first virtual two-dimensional image is based, at least in part, on a three-dimensional representation of a region having a plurality of graphic primitives, wherein each one of the plurality of graphic primitives has an attribute,
   wherein at least a portion of the three-dimensional representation of the region is color coded, and
   wherein the attribute is based, at least in part, on a value corresponding to the color coding.

5. The method of claim 1, wherein the determining of the first virtual two-dimensional image includes rendering the first virtual two-dimensional image using a frame buffer.

6. The method of claim 1, wherein the determining of the first virtual two-dimensional image comprises rendering the first virtual two-dimensional image based, at least in part, on a three-dimensional representation of a region, the method further comprising:
   rendering a map to create the three-dimensional representation of the region.

7. The method of claim 1, wherein the first and second landmarks are disposed in a building having a plurality of floors disposed at a plurality of elevations, wherein the first landmark and the second landmark are further disposed on different floors of the plurality of floors, and wherein the first location of the imaging device is on one of the plurality of floors.

8. The method of claim 1,
   wherein the determining of the first virtual two-dimensional image comprises rendering the first virtual two-dimensional image based, at least in part, on a three-dimensional representation of a region,
   wherein the determining of the second virtual two-dimensional image comprises rendering the second virtual two-dimensional image based, at least in part, on the three-dimensional representation of the region,
   wherein the three-dimensional representation of the region comprises a plurality of graphic primitives, wherein each one of the plurality of graphic primitives has an attribute, and
   wherein the matching of the portions of the first and second virtual two-dimensional images comprises matching the attribute of at least one of the plurality of graphic primitives in the first virtual two-dimensional image with the attribute of at least one of the plurality of graphic primitives in the second virtual two-dimensional image.

9. The method of claim 8,
   wherein at least a portion of the three-dimensional representation of the region is coded, wherein the attribute of each one of the plurality of graphic primitives is based, at least in part, on a value corresponding to the coding, wherein the matching of the attribute of the at least one of the plurality of graphic primitives in the first virtual two-dimensional image with the attribute of the at least one of the plurality of graphic primitives in the second virtual two-dimensional image comprises matching a first value with a second value, wherein the first value corresponds to the attribute of the at least one of the plurality of graphic primitives in the first virtual two-dimensional image, and wherein the second value corresponds to the attribute of the at least one of the plurality of graphic primitives in the second virtual two-dimensional image.

10. The method of claim 9, wherein the at least the portion of the three-dimensional representation of the region is coded according to a RGB color model, and wherein the value of the attribute of each one of the plurality of graphic primitives is based, at least in part, on a RGB triplet value.

11. An apparatus comprising:
a memory; and
one or more processors in communication with the memory, wherein the one or more processors are configured to:
identify a first landmark in a first image obtained by the apparatus positioned at a first location, wherein the apparatus is in a first pose during a time that the first image is obtained;
determine a first virtual two-dimensional image of a first view from a first viewpoint at the first landmark based, at least in part, on the first pose;
estimate the first location based, at least in part, on the first virtual two-dimensional image;
identify a second landmark in a second image obtained by the apparatus positioned at the first location, wherein the apparatus is in a second pose during a time that the second image is obtained, and wherein the second pose is different from the first pose; and
determine a second virtual two-dimensional image of a second view from a second viewpoint at the second landmark based, at least in part, on the second pose,
wherein the estimating of the first location includes estimating the first location based, at least in part, on a matching of portions of the first virtual two-dimensional image with portions of the second virtual two-dimensional image.

12. The apparatus of claim 11 wherein the one or more processors are further configured to determine the first virtual two-dimensional image based, at least in part, on a three-dimensional representation of a region having a plurality of graphic primitives, wherein each one of the plurality of graphic primitives has an attribute.

13. The apparatus of claim 11 wherein the one or more processors are further configured to determine the first virtual two-dimensional image based, at least in part, on a three-dimensional representation of a region having a plurality of graphic primitives,
wherein each one of the plurality of graphic primitives has an attribute,
wherein at least a portion of the three-dimensional representation of the region is color coded, and
wherein the attribute is based, at least in part, on a value corresponding to the color coding.

14. The apparatus of claim 11, wherein the one or more processors are configured to determine the first virtual two-dimensional image by rendering the first virtual two-dimensional image based, at least in part, on a three-dimensional representation of a region, and
to determine the second virtual two-dimensional image by rendering the second virtual two-dimensional image based, at least in part, on the three-dimensional representation of the region.

15. The apparatus of claim 14, wherein the three-dimensional representation of the region comprises a plurality of graphic primitives,
wherein each one of the plurality of graphic primitives has an attribute, and
wherein the matching of the portions of the first and second virtual two-dimensional images comprises matching the attribute of at least one of the plurality of graphic primitives in the first virtual two-dimensional image with the attribute of at least one of the plurality of graphic primitives in the second virtual two-dimensional image.

16. A non-transitory, computer-readable, storage medium comprising machine-readable instructions stored thereon which are executable by a special purpose computing apparatus to:
identify a first landmark in a first image obtained by the special purpose computing apparatus positioned at a first location, wherein the special purpose computing apparatus is in a first pose during a time that the first image is obtained;
determine a first virtual two-dimensional image of a first view from a first viewpoint at the first landmark based, at least in part, on the first pose;
estimate the first location based, at least in part, on the first virtual two-dimensional image;
identify a second landmark in a second image obtained by the special purpose computing apparatus positioned at the first location, wherein the special purpose computing apparatus is in a second pose during a time that the second image is obtained, and wherein the second pose is different from the first pose; and
determine a second virtual two-dimensional image of a second view from a second viewpoint at the second landmark based, at least in part, on the second pose,
wherein the estimating of the first location includes estimating the first location based, at least in part, on a matching of portions of the first virtual two-dimensional image with portions of the second virtual two-dimensional image.

17. The non-transitory, computer-readable, storage medium of claim 16 wherein the instructions are further executable by the special purpose computing apparatus to determine the first virtual two-dimensional image by rendering the first virtual two-dimensional image based, at least in part, on a three-dimensional representation of a region.

* * * * *